(12) United States Patent
Go et al.

(10) Patent No.: US 12,335,190 B2
(45) Date of Patent: Jun. 17, 2025

(54) METHOD AND DEVICE FOR TRANSMITTING/RECEIVING SOUNDING REFERENCE SIGNALS IN WIRELESS COMMUNICATION SYSTEM

(71) Applicant: LG ELECTRONICS INC., Seoul (KR)

(72) Inventors: Seongwon Go, Seoul (KR); Jiwon Kang, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 17/799,480

(22) PCT Filed: Feb. 15, 2021

(86) PCT No.: PCT/KR2021/001861
§ 371 (c)(1),
(2) Date: Aug. 12, 2022

(87) PCT Pub. No.: WO2021/162496
PCT Pub. Date: Aug. 19, 2021

(65) Prior Publication Data
US 2024/0031097 A1 Jan. 25, 2024

(30) Foreign Application Priority Data
Feb. 13, 2020 (KR) .................. 10-2020-0017967

(51) Int. Cl.
*H04W 4/00* (2018.01)
*H04L 5/00* (2006.01)
*H04W 72/232* (2023.01)

(52) U.S. Cl.
CPC ......... *H04L 5/0051* (2013.01); *H04W 72/232* (2023.01)

(58) Field of Classification Search
CPC ... H04L 5/0051; H04L 5/0048; H04L 5/0094; H04L 5/001; H04W 72/232; H04W 72/0446; H04B 7/0456; Y02D 30/70
See application file for complete search history.

(56) References Cited

U.S. PATENT DOCUMENTS 10,841,914 B2 * 11/2020 Liou ................ H04L 5/0094
11,140,695 B1 * 10/2021 Eyuboglu .......... H04W 72/535
(Continued)

FOREIGN PATENT DOCUMENTS

KR 10-2019-0051993 A 5/2019
KR 10-2019-0090869 A 8/2019
(Continued)

OTHER PUBLICATIONS

LG Electronic, "Feature lead summary#3 of Enhancements on Multi-beam Operations", 3GPP TSG RAN WG1 Meeting #97, R1-1907860, Reno, USA, May 13-17, 2019.
(Continued)

*Primary Examiner* — Stephen M D Agosta
(74) *Attorney, Agent, or Firm* — BRYAN CAVE LEIGHTON PAISNER LLP

(57) ABSTRACT

Disclosed are a method and device for transmitting/receiving sounding reference signals in a wireless communication system. A method for transmitting sounding reference signal (SRS) according to an embodiment of the present disclosure comprises the steps of: receiving configuration information related to N (N is a natural number) SRS resource sets from a base station; receiving, from the base station, downlink control information (DCI) for triggering the transmission of SRSs on M (M≤N, M is a natural number) SRS resource sets among the N SRS resource sets; and transmitting the SRSs on SRS resources of each of the M SRS resource sets to the
(Continued)

base station. The M SRS resource sets may each be related to a different panel of the terminal.

13 Claims, 12 Drawing Sheets

(56) References Cited

U.S. PATENT DOCUMENTS

| | | | |
|---|---|---|---|
| 11,206,549 B1* | 12/2021 | Eyuboglu | H04W 72/1273 |
| 11,271,699 B1* | 3/2022 | Eyuboglu | H04L 1/1819 |
| 11,375,527 B1* | 6/2022 | Eyuboglu | H04B 7/15528 |
| 2011/0143749 A1 | 6/2011 | Guo et al. | |
| 2012/0257582 A1 | 10/2012 | Damnjanovic et al. | |
| 2014/0241242 A1* | 8/2014 | Josiam | H04W 88/02 370/328 |
| 2018/0206132 A1* | 7/2018 | Guo | H04W 72/0473 |
| 2019/0158236 A1* | 5/2019 | Yoo | H04L 5/0094 |
| 2019/0174466 A1* | 6/2019 | Zhang | H04L 5/0057 |
| 2019/0230599 A1* | 7/2019 | Nam | H04W 76/27 |
| 2019/0254061 A1* | 8/2019 | Manolakos | H04L 5/0051 |
| 2019/0281588 A1 | 9/2019 | Zhang et al. | |
| 2019/0364438 A1* | 11/2019 | Yang | H04W 16/28 |
| 2020/0059286 A1* | 2/2020 | Xiong | H04W 48/16 |
| 2020/0092055 A1* | 3/2020 | Choi | H04L 5/005 |
| 2020/0106168 A1* | 4/2020 | Hakola | H04B 7/0617 |
| 2020/0205173 A1* | 6/2020 | Frederiksen | H04L 1/1854 |
| 2020/0235802 A1* | 7/2020 | Nilsson | H04L 25/0226 |
| 2020/0389885 A1* | 12/2020 | Tomeba | H04W 72/21 |
| 2020/0396047 A1* | 12/2020 | Gao | H04L 5/10 |
| 2021/0067289 A1* | 3/2021 | Zhu | H04B 7/088 |
| 2021/0076324 A1* | 3/2021 | Kaikkonen | H04W 76/28 |
| 2021/0288711 A1* | 9/2021 | Cao | H04W 72/046 |
| 2021/0297210 A1* | 9/2021 | Seo | H04W 72/20 |
| 2022/0052820 A1* | 2/2022 | Ling | H04W 72/23 |
| 2022/0094415 A1* | 3/2022 | Hakola | H04B 7/0691 |

FOREIGN PATENT DOCUMENTS

| | | |
|---|---|---|
| KR | 10-2020-0008599 A | 1/2020 |
| WO | 2019-214555 A1 | 11/2019 |

OTHER PUBLICATIONS

Intel Corporation, "Remaining Details of UL PRS Design for NR Positioning", 3GPP TSG RAN WG1 Meeting #97bis, R1-1910675, Chongquing, China, Oct. 14-20, 2019.

* cited by examiner (a)

(b)

METHOD AND DEVICE FOR TRANSMITTING/RECEIVING SOUNDING REFERENCE SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2021/001861, filed on Feb. 15, 2021, which claims the benefit of and priority to Korean Application No. 10-2020-0017967, filed on Feb. 13, 2020, the contents of which are all hereby incorporated by reference herein in their entirety.

TECHNICAL FIELD

The present disclosure relates to a wireless communication system, and in more detail, relates to a method and an apparatus of transmitting and receiving a sounding reference signal in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving a sounding reference signal.

In addition, an additional technical object of the present disclosure is to provide a method and an apparatus of allocating/configuring resources for transmitting a sounding reference signal at a symbol level.

In addition, an additional technical object of the present disclosure is to provide a method and an apparatus of triggering a plurality of sounding reference signal resource sets through one downlink control information.

In addition, an additional technical object of the present disclosure is to provide a method and an apparatus for triggering to transmit a single sounding reference signal resource set repeatedly multiple times.

The technical objects to be achieved by the present disclosure are not limited to the above-described technical objects, and other technical objects which are not described herein will be clearly understood by those skilled in the pertinent art from the following description.

Technical Solution

A method of transmitting a sounding reference signal (SRS) in a wireless communication system may include: receiving, from a base station, configuration information related to N (N is a natural number) SRS resource sets; receiving, from the base station, downlink control information (DCI) for triggering transmission of the SRS on M (M≤N, M is a natural number) SRS resource sets among the N SRS resource sets; and transmitting, to the base station, the SRS on SRS resources of each of the M SRS resource sets. Each of the M SRS resource sets may be related to a different panel of the terminal.

A terminal of transmitting a sounding reference signal (SRS) in a wireless communication system according to an additional aspect of the present disclosure may include: at least one transceiver for transmitting and receiving a wireless signal; and at least one processor for controlling the at least one transceiver. The at least one processor may be configured to: receive, from a base station, configuration information related to N (N is a natural number) SRS resource sets; receive, from the base station, downlink control information (DCI) for triggering transmission of the SRS on M (M≤N, M is a natural number) SRS resource sets among the N SRS resource sets; and transmit, to the base station, the SRS on SRS resources of each of the M SRS resource sets. Each of the M SRS resource sets may be related to a different panel of the terminal.

A method of receiving a sounding reference signal (SRS) in a wireless communication system according to an additional aspect of the present disclosure may include: transmitting, to a terminal, configuration information related to N (N is a natural number) SRS resource sets; transmitting, from the terminal, downlink control information (DCI) for triggering transmission of the SRS on M (M≤N, M is a natural number) SRS resource sets among the N SRS resource sets; and receiving, from the terminal, the SRS on SRS resources of each of the M SRS resource sets. Each of the M SRS resource sets is related to a different panel of the terminal.

At least one non-transitory computer-readable medium storing at least one instruction according to an additional aspect of the present disclosure, wherein the at least one instruction executable by at least one processor may control a device to: receive, from a base station, configuration information related to N (N is a natural number) SRS resource sets; receive, from the base station, downlink control information (DCI) for triggering transmission of the SRS on M (M≤N, M is a natural number) SRS resource sets among the N SRS resource sets; and transmit, to the base station, the SRS on SRS resources of each of the M SRS resource sets. Each of the M SRS resource sets may be related to a different panel of the terminal.

A processing apparatus configured to control a terminal for transmitting a sounding reference signal (SRS) in a wireless communication system, the processing apparatus may include: at least one processor; and at least one computer memory operably connected to the at least one processor and storing instructions that, based on being executed by the at least one processor, perform operations. The operations may include: receiving, from a base station, configuration information related to N (N is a natural number) SRS resource sets; receiving, from the base station, downlink control information (DCI) for triggering transmission of the SRS on M (M≤N, M is a natural number) SRS resource sets among the N SRS resource sets; and transmitting, to the base station, the SRS on SRS resources of each of the M SRS resource sets. Each of the M SRS resource sets may be related to a different panel of the terminal.

Preferably, the M SRS resource sets may be configured with the same usage value.

Preferably, the usage value may include at least one of beam management, codebook, non-codebook, antenna switching and/or positioning.

Preferably, a plurality of SRS resource sets may be mapped to each codepoint of a field triggering the transmission of the SRS in the DCI.

Preferably, the plurality of SRS resource sets may be mapped to different panels of the terminal in a predetermined order.

Preferably, a slot offset may be configured for each of the N SRS resource sets in the configuration information, and the slot offset may be an interval from a transmission slot of DCI to a transmission slot of an SRS.

Preferably, based on the SRS for the M SRS resource sets colliding in at least one symbol in a first slot, an SRS for an SRS resource set in which shorter slot offset is configured may be transmitted in the first slot, and an SRS for an SRS resource set in which longer slot offset is configured may be transmitted in an uplink slot available for SRS transmission after the first slot.

Preferably, the configuration information may include a starting position for SRS transmission in a slot and/or the number of symbols for SRS transmission in a slot for each SRS resource in the N SRS resource sets.

Preferably, the starting position may be updated by a medium access control (MAC) control element (CE).

Preferably, a symbol level offset for the M SRS resource sets may be indicated by the DCI, and the transmission of the SRS in a slot may be determined by applying the symbol level offset to the starting position.

Preferably, a symbol level offset for the N SRS resource sets may be indicated by the DCI.

Preferably, available symbols in a slot may be indicated by the DCI, and symbol indexes for the available symbols may be re-indexed, and the starting position and/or the number of slots may be applied in the re-indexed available symbols.

Preferably, the M SRS resource sets may be transmitted repeatedly multiple times over a plurality of slots.

Advantageous Effects

According to an embodiment of the present disclosure, a signaling overhead may be reduced by triggering a plurality of sounding reference signal resource sets by single downlink control information.

According to an embodiment of the present disclosure, a signaling overhead may be reduced by triggering a sounding reference signal for an aperiodic sounding reference signal resource set to transmit it repeatedly.

In addition, according to an embodiment of the present disclosure, flexibility may be provided for transmission of a sounding reference signal and a collision with other uplink channels may be prevented by indicating the number of symbols and a transmission symbol starting position of a sounding reference signal as any symbol in a slot.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
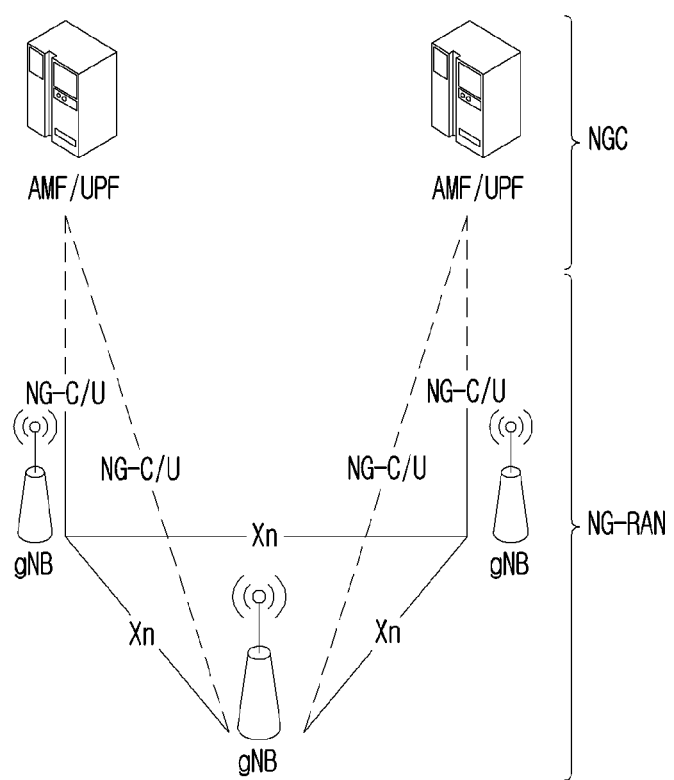
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
 CQI: Channel Quality Indicator
 CRI: channel state information—reference signal resource indicator
 CSI: channel state information
 CSI-IM: channel state information—interference measurement
 CSI-RS: channel state information reference signal
 DMRS: demodulation reference signal
 FDM: frequency division multiplexing
 FFT: fast Fourier transform
 IFDMA: interleaved frequency division multiple access
 IFFT: inverse fast Fourier transform
 L1—RSRP: Layer 1 reference signal received power
 L1—RSRQ: Layer 1 reference signal received quality
 MAC: medium access control NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
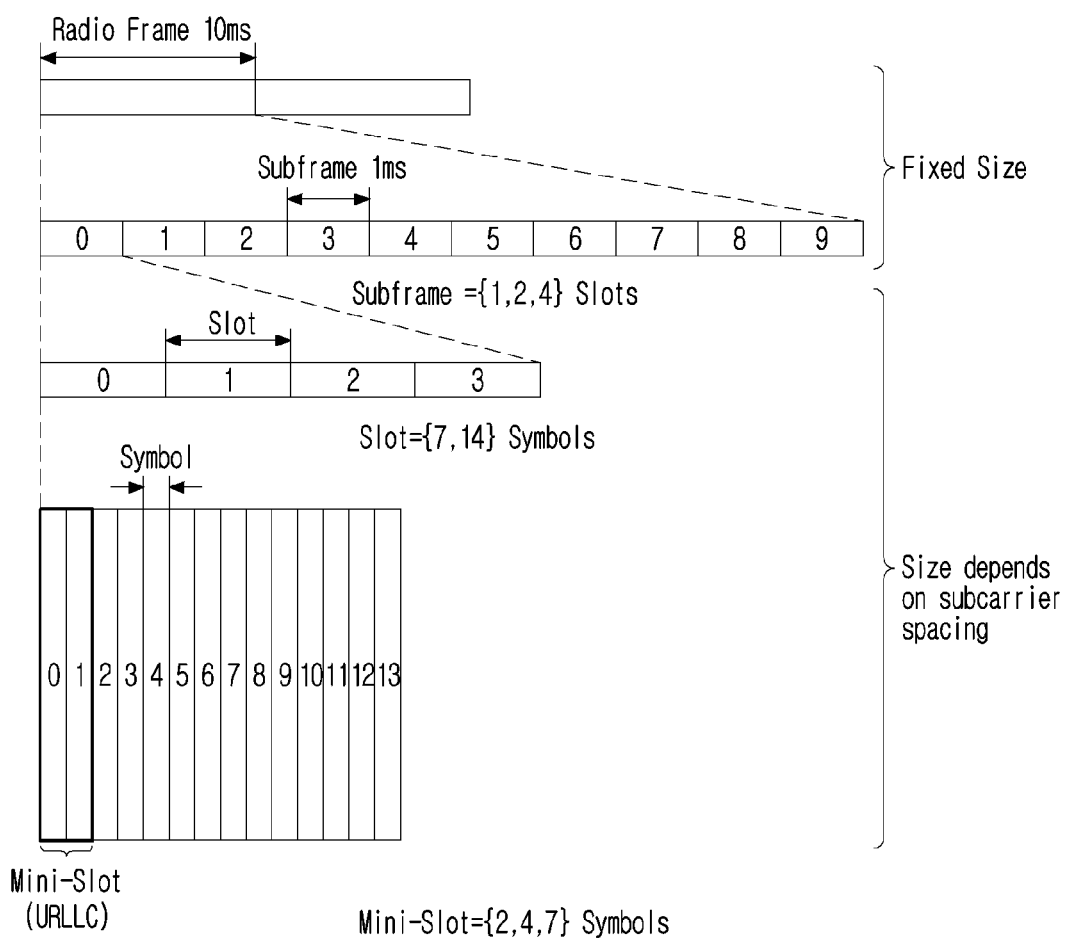
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHZ-7125 MHZ | 15, 30, 60 kHz |
| FR2 | 24250 MHZ-52600 MHZ | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} \cdot N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
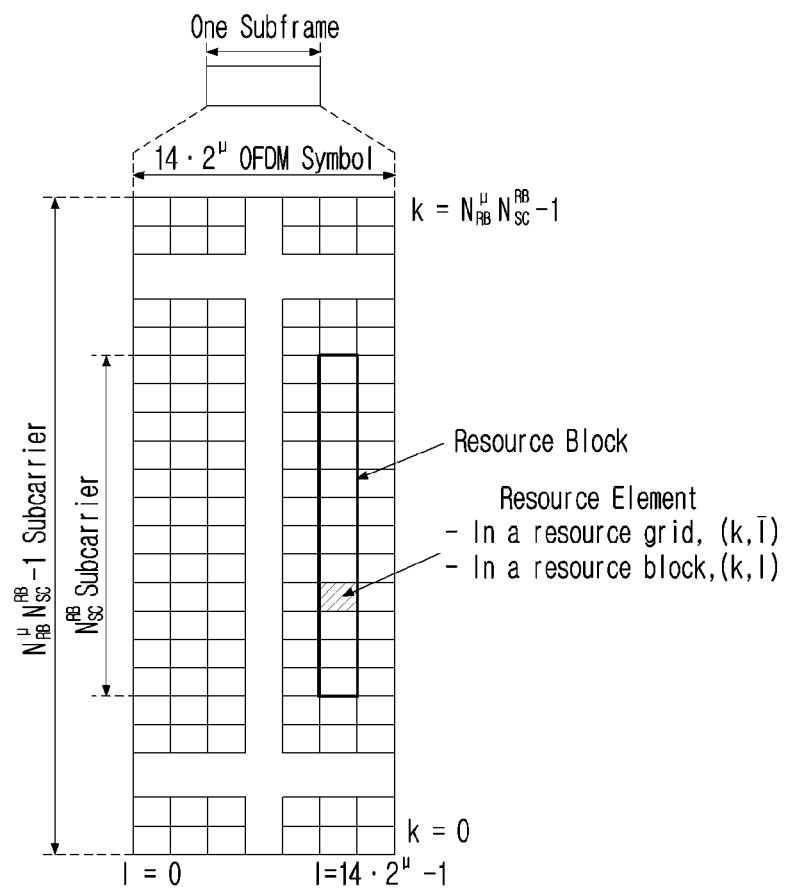
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with 14.2^μ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration p is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \quad \text{[Equation 2]}$$

$N_{BWP,i}^{start,\mu}$ is a common resource block that a BWP starts relatively to common resource block 0.

Figure 4:
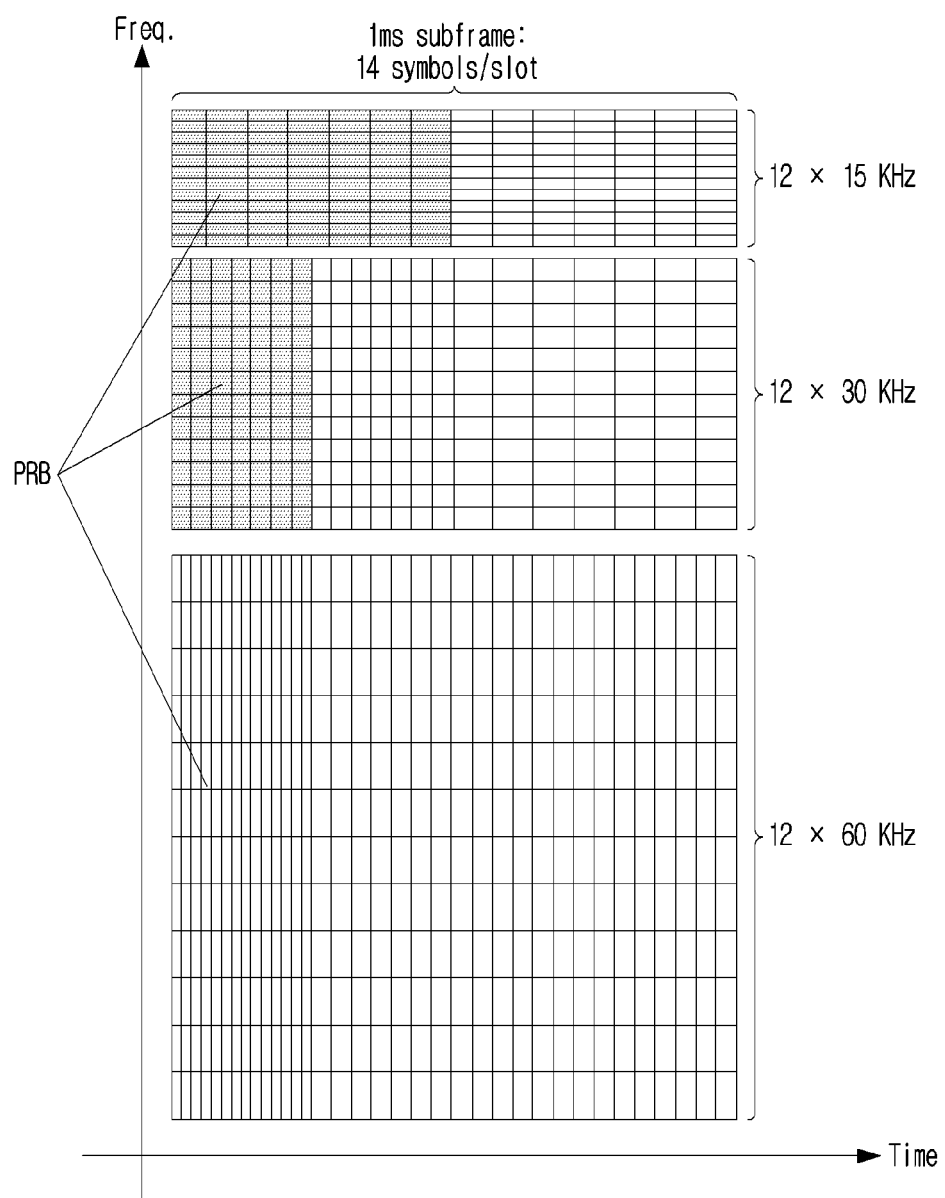
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
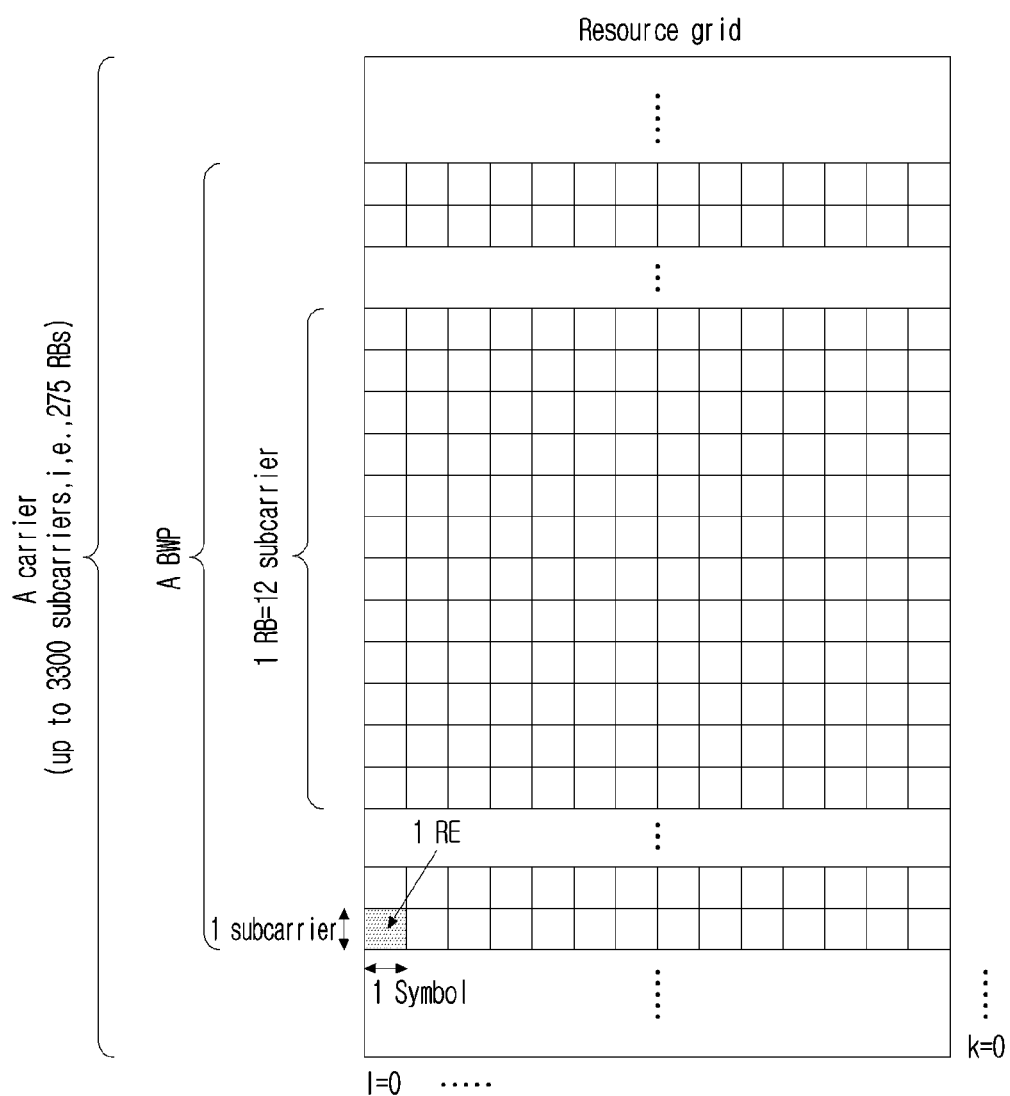
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
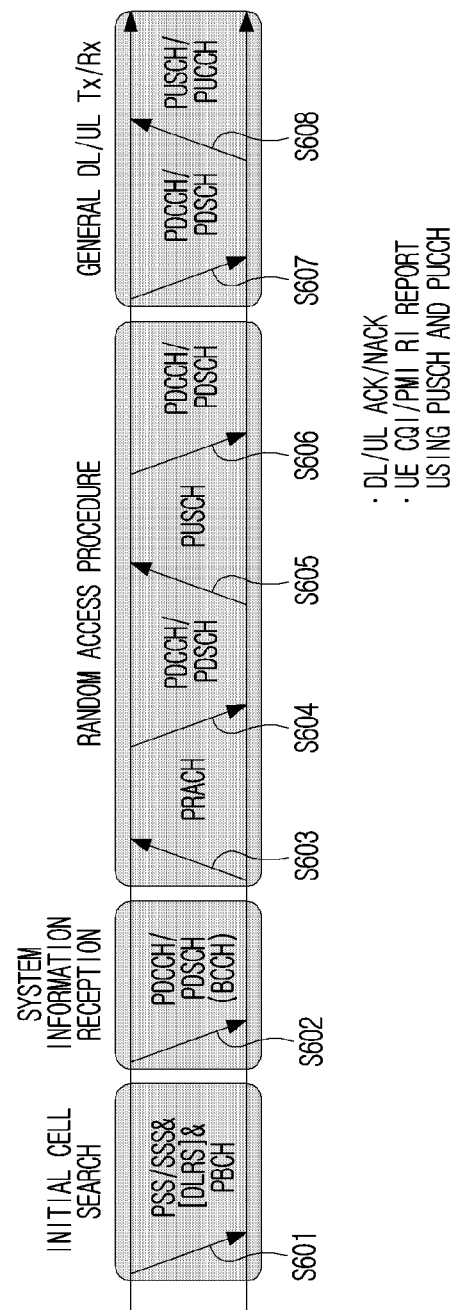
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be predefined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Multi Panel Operations

'A Panel' referred to in the present disclosure may be interpreted/applied as 'a plurality of (or at least one) panels' or 'a panel group' (having similarity/a common value with regard to a specific characteristic (e.g., timing advance (TA), a power control parameter, etc.)). Alternatively, 'a panel' referred to in the present disclosure may be interpreted/ applied as 'a plurality of (or at least one) antenna ports' or 'a plurality of (or at least one) uplink resources' or 'an antenna port group' or 'an uplink resource group (or set))' (having similarity/a common value with regard to a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having similarity/a common value with regard to a specific characteristic (e.g., TA, a power control parameter, etc.)). Alternatively, 'a panel' referred to in the present disclosure may be defined as a unit for a terminal to configure a transmission/ reception beam. For example, 'a transmission panel' may be defined as a unit which may generate a plurality of candidate transmission beams in one panel, but may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set))' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/ logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be different according to terminal implementation. In addition, 'a panel' referred to in the present disclosure may be interpreted/applied as 'a plurality of panels' or 'a panel group' (having similarity with regard to a specific characteristic).

Hereinafter, multi panel structures will be described. For terminal implementation in a high-frequency band, modeling terminal equipped with a plurality of panels (e.g., configured with one or a plurality of antennas) is considered (e.g., 2 bi-directional panels in 3GPP UE antenna modeling). A variety of forms may be considered for such implementation of a plurality of panels of a terminal. The afterdescribed contents are based on a terminal which supports a plurality of panels, but they may be extended and applied to a base station which supports a plurality of panels (e.g., TRP). The after-described contents related to multi panel structures may be applied to transmission and reception of a signal and/or a channel considering multi panels described in the present disclosure.

Figure 7:
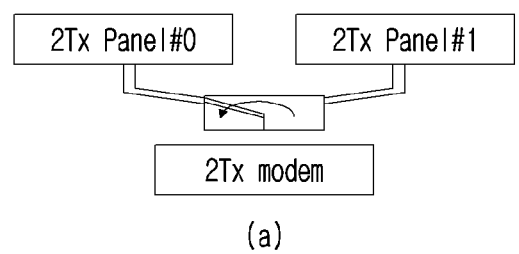
FIG. 7 is a diagram illustrating multi panel terminals in a wireless communication system to which the present disclosure may be applied.
Figure 7:
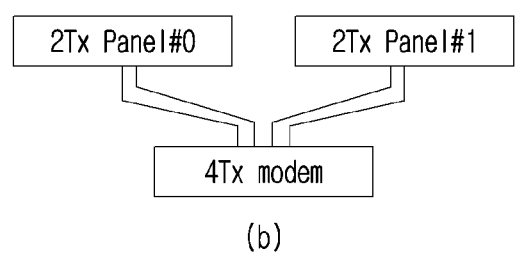

FIG. 7 is a diagram illustrating multi panel terminals in a wireless communication system to which the present disclosure may be applied.

FIG. 7(a) illustrates implementation of RF (radio frequency) switch-based multi panel terminals and FIG. 7(b) illustrates implementation of RF connection-based multi panel terminals.

For example, it may be implemented based on RF switch as in FIG. 7(a). In this case, only one panel is activated for a moment, and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(b). In this case, time for panel switching may be 0 or too little. And, it may be possible to simultaneously transmit a signal by activating a plurality of panels at the same time (STxMP: simultaneous transmission across multi-panel) according to a modem and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as a SRS resource group. For this SRS resource group, a SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 7(b) are considered, a corresponding concept (a SRS resource set) itself may be matched to a SRS resource group. But, a SRS resource group may be separately defined if even implementation (panel switching) as in FIG. 7(a) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 6

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
| --- | --- |
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for UE which performs capability reporting for a value reported in feature group (FG) 2-30 as 7 or 8 in Table 6, a total of up to 4 SRS resource sets for BM (per supported time domain behavior) may be configured as in the right column of Table 6. As above, implementation which performs transmission by corresponding one UE panel to each set may be applied.

In this case, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which can be transmitted per each panel. In other words, the UE may respectively correspond 2 UL beams to 2 configured SRS resources per each panel and transmit them, when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

MPUE category 1: In a terminal that multiple panels are implemented, only one panel may be activated at a time. A delay for panel switching/activation may be configured as [X]ms. In an example, the delay may be configured to be longer than a delay for beam switching/activation and may be configured in a unit of a symbol or in a unit of a slot. MPUE category 1 may correspond to MPUE-assumption) described in standardization-related documents (e.g., a 3gpp agreement, a technical report (TR) document and/or a technical specification (TS) document, etc.).

MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, a SRS, and/or a PRACH among activated multiple panels. The ID may be configured/defined based on at least any one of the following 4 methods (options (Alts) 1, 2, 3, 4).

i) Alt.1: An ID for a panel may be a SRS resource set ID.

In an example, it may be desirable to correspond each UE Tx panel to a SRS resource set configured with regard to terminal implementation when considering a) an aspect that SRS resources of multiple SRS resource sets having the same time domain behavior are simultaneously transmitted in the same BWP, b) an aspect that a power control parameter is configured in a unit of a SRS resource set, c) an aspect that a terminal may report as up to 4 SRS resource sets (they may correspond to up to 4 panels) according to a supported time domain behavior. In addition, an Alt.1 scheme has an advantage that a SRS resource set related to each panel may be used for 'codebook' and 'non-codebook'-based PUSCH transmission. In addition, for an Alt.1 scheme, multiple SRS resources belonging to multiple SRS resource sets may be selected by extending a SRI (SRS resource indicator) field of DCI. In addition, a mapping table of an SRI to an SRS resource may need to be extended to include SRS resources in the whole SRS resource set.

ii) Alt.2: An ID for a panel may be an ID which is (directly) associated with a reference RS resource and/or a reference RS resource set.

iii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC_SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., a SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to panel may be configured in a unit of a single panel or in a unit of multiple panels (e.g., a panel group, a panel set).

Sounding Reference Signal (SRS)

In Rel-15 NR, spatialRelationInfo may be used in order for a base station to indicate to a terminal a transmission beam which will be used when transmitting an UL channel. A base station may indicate which UL transmission beam will be used when transmitting a PUCCH and an SRS by configuring a DL reference signal (e.g., an SSB-RI (SB Resource Indicator), a CRI (CSI-RS Resource Indicator)(P/SP/AP: periodic/semi-persistent/aperiodic)) or an SRS (i.e., an SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through an SRI field and used as a PUSCH transmission beam of a terminal.

Hereinafter, a SRS for a codebook (CB) and a non-codebook (NCB) will be described.

First, for a CB UL, a base station may first configure and/or indicate transmission of an SRS resource set for 'a CB' to a terminal. In addition, a terminal may transmit any n port SRS resource in a corresponding SRS resource set. A base station may receive a UL channel based on corresponding SRS transmission and use it for PUSCH scheduling of a terminal. Subsequently, a base station may indicate a PUSCH (transmission) beam of a terminal by indicating a SRS resource for 'a CB' which is previously transmitted by a terminal through a SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of an SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS associated with a corresponding SRS resource set. Subsequently, a base station may indicate a PUSCH (transmission) beam of a terminal and an UL rank and an UL precoder at the same time by indicating part of SRS resources for 'a non-CB' which are previously transmitted by a terminal through an SRI field of DCI when performing PUSCH scheduling through UL DCI. Thereby, a terminal may perform PUSCH transmission according to a corresponding indication.

Hereinafter, an SRS for beam management will be described.

An SRS may be used for beam management. Specifically, UL BM may be performed by beamformed UL SRS transmission. Whether UL BM of an SRS resource set is applied is configured by (a higher layer parameter) 'usage'. When usage is configured as 'BeamManagement (BM)', only one SRS resource may be transmitted to each of a plurality of SRS resource sets in a given time instant. A terminal may be configured with one or more Sounding Reference Symbol (SRS) resource sets configured by (a higher layer parameter) 'SRS-ResourceSet' (through higher layer signaling, e.g., RRC signaling, etc.). For each SRS resource set, UE may be configured with K≥1 SRS resources (a higher layer parameter, 'SRS-resource'). Here, K is a natural number and the maximum value of K is indicated by SRS capability.

Hereinafter, an SRS for antenna switching will be described.

An SRS may be used for acquisition of DL CSI (Channel State Information) information (e.g., DL CSI acquisition). In a specific example, a BS (Base station) may measure an SRS from UE after scheduling transmission of an SRS to UE (User Equipment) under a situation of a single cell or in multi cells (e.g., carrier aggregation (CA)) based on TDD. In this case, a base station may perform scheduling of a DL signal/channel to UE based on measurement by an SRS by assuming DL/UL reciprocity. Here, regarding SRS-based DL CSI acquisition, an SRS may be configured for antenna switching.

In an example, when following standards (e.g., 3gpp TS38.214), usage of an SRS may be configured to a base station and/or a terminal by using a higher layer parameter (e.g., usage of a RRC parameter, SRS-ResourceSet). Here, usage of a SRS may be configured as usage of beam management, usage of codebook transmission, usage of non-codebook transmission, usage of antenna switching, etc.

Hereinafter, a case in which SRS transmission (i.e., transmission of an SRS resource or an SRS resource set) is configured for antenna switching among the usages will be specifically described.

In an example, for a terminal with partial reciprocity, SRS transmission based on antenna switching (i.e., transmission antenna switching) may be supported for DL (downlink) CSI (Channel State Information) acquisition through SRS transmission under a situation such as TDD (Time Division Duplex). When antenna switching is applied, about 15 µs may be generally needed between SRS resources (and/or resources between a SRS resource and a PUSCH/a PUCCH) for antenna switching of a terminal. By considering it, (the minimum) guard period as in the following Table 7 may be defined.

TABLE 7

| µ | $\Delta f = 2^\mu \cdot 15$ [kHz] | Y [ Symbol] |
|---|---|---|
| 0 | 15 | 1 |
| 1 | 30 | 1 |
| 2 | 60 | 1 |
| 3 | 120 | 2 |

In Table 7, µ represents numerology, Δf represents subcarrier spacing and Y represents the number of symbols of a guard period, i.e., a length of a guard period. In reference to Table 7, the guard period may be configured based on a parameter µ which determines numerology. In the guard period, a terminal may be configured not to transmit any other signal and the guard period may be configured to be used fully for antenna switching. In an example, the guard period may be configured by considering SRS resources transmitted in the same slot. In particular, when a terminal is configured and/or indicated to transmit an aperiodic SRS configured by intra-slot antenna switching, a corresponding terminal may transmit an SRS on each designated SRS resource by using a different transmission antenna and the above-described guard period may be configured between each resource.

In addition, as described above, when a terminal is configured with an SRS resource and/or an SRS resource set configured for antenna switching through higher layer signaling, a corresponding terminal may be configured to perform SRS transmission based on UE capability related to antenna switching. In this case, UE capability related to antenna switching may be '1T2R', '2T4R', '1T4R', '1T4R/2T4R', '1T1R', '2T2R' '4T4R', etc. Here, 'mTnR' may mean UE capability which supports m transmission and n reception.

(Example S1) For example, for a terminal which supports 1T2R, up to 2 SRS resource sets may be configured as a different value for resourceType of a higher layer parameter SRS-ResourceSet. In this case, each SRS resource set may have 2 SRS resources transmitted in different symbols and each SRS resource may configure a single SRS port in a given SRS resource set. In addition, an SRS port for a second SRS resource in an SRS resource set may be configured to be associated with a UE antenna port different from an SRS port for a first SRS resource in the same SRS resource set.

(Example S2) In another example, for a terminal which supports 2T4R, up to 2 SRS resource sets may be configured as a different value for resourceType of a higher layer parameter SRS-ResourceSet. Here, each SRS resource set may have 2 SRS resources transmitted in different symbols and each SRS resource may configure 2 SRS ports in a given SRS resource set. In addition, an SRS port pair for a second SRS resource in an SRS resource set may be configured to be associated with a UE antenna port different from an SRS port pair for a first SRS resource in the same SRS resource set.

(Example S3) In another example, for a terminal which supports 1T4R, SRS resource sets may be configured by a different scheme according to whether SRS transmission is configured as periodic, semi-persistent and/or aperiodic. First, when SRS transmission is configured as periodic or semi-persistent, 0 SRS resource set configured or 1 SRS resource set configured with 4 SRS resources based on resourceType of a higher layer parameter SRS-ResourceSet may be configured to be transmitted in different symbols. Here, each SRS resource may configure a single SRS port in a given SRS resource set. In addition, an SRS port for each SRS resource may be configured to be associated with a different UE antenna port. On the other hand, when SRS transmission is configured as aperiodic, 0 SRS resource set configured or 2 SRS resource sets configured with a total of 4 SRS resources based on resourceType of a higher layer parameter SRS-ResourceSet may be configured to be transmitted in different symbols of 2 different slots. Here, a SRS port for each SRS resource in 2 given SRS resource sets may be configured to be associated with a different UE antenna port.

(Example S4) In another example, for a terminal which supports 1T1R, 2T2R, or 4T4R, up to 2 SRS resource sets respectively configured with one SRS resource may be configured for SRS transmission. The number of SRS ports of each SRS resource may be configured to be 1, 2, or 4.

When indicated UE capability is 1T4R/2T4R, a corresponding terminal may expect that the same number of SRS ports (e.g., 1 or 2) will be configured for all SRS resources in SRS resource set(s). In addition, when indicated UE capability is 1T2R, 2T4R, 1T4R, or 1T4R/2T4R, a corresponding terminal may not expect that one or more SRS resource sets configured for antenna switching in the same slot will be configured or triggered. In addition, when indicated UE capability is 1T1R, 2T2R, or 4T4R, a corresponding terminal may not expect that one or more SRS resource sets configured for antenna switching in the same slot will be configured or triggered.

A Method for Transmission and Reception of an SRS

In NR MIMO Rel-17, an additional (or enhanced) SRS supporting more symbols may be defined for the existing NR legacy SRS (i.e., up to 4 symbols in one SRS resource may be configured in last 6 symbols in one slot).

In reference to a Rel-17 NR MIMO (FeMIMO) discussion for SRS enhancement, SRS enhancement targeted for both FR1 and FR2:
  a. identifies and specifies enhancement in aperiodic SRS triggering to enable more flexible triggering and/or a decrease in a DCI overhead/usage.
  b. specifies SRS switching up to 8 antennas (e.g., xTyR, x={1, 2, 4} and y={6, 8}).
  c. evaluates the following mechanism(s) and if necessary, specifies them to enhance an SRS capacity and/or coverage: SRS time bundling, increased SRS repetitions, partial sounding across a frequency.

As such, it is expected that multi-symbol SRSs will be supported in a time domain space/resource (i.e., in a time domain region exceeding 4 symbols) except for last 6 symbols in one slot to enhance a capacity and coverage of a NR SRS. In this case, for a (Rel-17) additional (or enhanced) SRS, for a specific UL slot, a case may occur in which transmission timing of an SRS collides with transmission timing of a UL channel (e.g., a PUCCH, a PUSCH, a PRACH (physical random access channel), etc.) at a symbol level, and in this case, ambiguity may be generated in a terminal operation.

Based on this background, the present disclosure proposes a method for base station to configure an additional (or enhanced) SRS that supporting more symbols as well as a NR Legacy SRS to a terminal and a method of indicating transmission of an SRS, and proposes a method of transmitting subsequently an SRS of a terminal.

Specifically, a configuration method of a base station for an additional (enhanced) SRS after Rel-17 is proposed. In addition, in a corresponding configuration, for collision prevention between multi UEs (for capacity enhancement) or for dynamic symbol level resource allocation, a method of effectively supporting multi-symbol SRSs configured in 4 symbols or more through MAC control element (CE)/DCI update of a symbol level starting point value in a slot (or a configuration/an indication/update of a symbol level offset) is proposed. In addition, a method that 2 or more different aperiodic SRS (AP-SRS) resource sets are triggered by one DCI or/and a method that 1 AP-SRS resource set is triggered by multi-shots (i.e., multiple transmission) through one DCI and a method of transmitting subsequently an SRS of a terminal are proposed.

Hereinafter, in the present disclosure, "transmission of an SRS resource set" may be used in the same meaning as "transmission of an SRS based on information configured in an SRS resource set". In addition, "transmitting an SRS resource" or "transmitting SRS resources" may be used in the same meaning as "transmitting an SRS or SRSs based on information configured in an SRS resource". In addition, an SRS enhanced (or defined) after Rel-17 may be referred to as an additional SRS or an enhanced SRS. A terminal supporting a corresponding additional (enhanced) SRS may be referred to as additional UE or an enhanced terminal. Regarding it, a legacy SRS refers to an SRS that up to 4 symbols may be configured (legacy SRS configuration). In addition, an enhanced SRS (an additional SRS) refers to an SRS that 4 symbols or more may be configured (enhanced SRS (additional SRS) configuration). It is just for convenience of description, not for limiting a technical scope. For example, an SRS that up to 4 symbols may be configured may be referred to as a first SRS and an SRS that 4 symbols or more may be configured may be referred to as a second SRS. Accordingly, a legacy SRS configuration may be referred to as a first SRS configuration and an enhanced SRS (additional SRS) configuration may be referred to as a second SRS configuration.

Proposal 1: A Method of Configuring an SRS Resource (Set) of a Base Station for Capacity and/or Coverage Enhancement A base station may transmit a configuration for configuring an additional SRS for enhanced UE (after Rel-17) (e.g., a configuration for an SRS resource set, a configuration for an SRS resource) to enhanced UE separately from a configuration for a legacy SRS configuration. For example, an IE for configuring an additional SRS (e.g., SRS-ResourceSet-r17, SRS-Resource-r17) may be separately configured except for an IE for a legacy SRS configuration (e.g., SRS-ResourceSet, SRS-Resource, etc.) (before Rel-17) in a RRC configuration information element (IE), 'SRS-config'. An additional SRS configuration for such enhanced UE may be considered as a configuration including or/and exceeding a function of a legacy SRS configuration considering that 4 symbols or more may be configured in configuring time domain allocation in a slot for each SRS resource.

Therefore, enhanced UE does not expect to receive a legacy SRS configuration and an additional SRS configuration at the same time in 'SRS-config', an IE configured for a specific BWP in a specific cell. In other words, UE does not expect that both a legacy SRS configuration and an additional SRS configuration are configured. In other words, enhanced UE may receive a legacy SRS configuration or an additional SRS configuration (i.e., one of the two) for a specific BWP in a specific cell.

Proposal 2: A Method for Flexible/Dynamic Symbol Level Resource Allocation of a SRS Resource in an Additional SRS Configuration An additional SRS may be configured in more symbols compared with a legacy SRS. In other words, for a legacy SRS, up to 4 symbols may be configured in one SRS resource in last 6 symbols in one slot. However, an additional SRS may be configured in a time domain space/resource except for last 6 symbols in one slot. Accordingly, in a specific UL slot, when SRS transmission timing is overlapped (or collides) with transmission timing of other UL channel (e.g., a PUCCH, a PUSCH, a PRACH, another SRS, etc.), a probability of a collision at a symbol level increases. In other words, a collision may be occurred in at least one symbol. In addition, there may be a possibility that an SRS of specific UE collides with an SRS (or other UL channel) of other UE.

Proposal 2 proposes a method in which an SRS resource is allocated at a symbol level in a slot to prevent such a collision and effectively support a SRS multiplexing capacity of multi UE.

In the existing legacy SRS configuration, a RRC (radio resource control) configuration of a SRS resource in an IE, 'SRS-config', is as in the following Table 8.

TABLE 8

| | |
|---|---|
| SRS-Resource ::= | SEQUENCE { |
| srs-ResourceId | SRS-ResourceId, |
| nrofSRS-Ports | ENUMERATED {port1, ports2, ports4}, |
| ptrs-Port Index | ENUMERATED {n0, n1 |
| } | OPTIONAL, -- |
| Need R | |
| transmissionComb | CHOICE { |
| n2 | SEQUENCE { |
| combOffset-n2 | INTEGER (0..1), |
| cyclicShift-n2 | INTEGER (0..7) |
| }, | |
| n4 | SEQUENCE { |
| combOffset-n4 | INTEGER (0..3), |
| cyclicShift-n4 | INTEGER (0..11) |
| } | |
| }, | |
| resourceMapping | SEQUENCE { |
| startPosition | INTEGER (0..5), |
| nrofSymbols | ENUMERATED {n1, n2, n4}, |
| repetitionFactor | ENUMERATED {n1, n2, n4} |
| }, | |
| freqDomainPosition | INTEGER (0..67), |
| freqDomainShift | INTEGER (0..268), |
| freqHopping | SEQUENCE { |
| c-SRS | INTEGER (0..63), |
| b-SRS | INTEGER (0..3), |
| b-hop | INTEGER (0..3) |
| }, | |
| groupOrSequenceHopping | ENUMERATED { |
| neither, groupHopping, sequenceHopping }, | |
| resourceType | CHOICE { |
| aperiodic | SEQUENCE { |
| ... | |
| }, | |
| semi-persistent | SEQUENCE { |
| periodicityAndOffset-sp | SRS- |
| PeriodicityAndOffset, | |
| ... | |
| }, | |
| periodic | SEQUENCE { |
| periodicityAndOffset-p | SRS- |
| PeriodicityAndOffset, | |
| ... | |
| } | |
| }, | |
| sequenceId | INTEGER (0..1023), |
| spatialRelationInfo | SRS- |
| SpatialRelationInfo | |
| OPTIONAL, -- Need R | |
| ... | |
| } | |

In reference to Table 8, a symbol level starting point value of a corresponding SRS resource may be configured through a parameter, 'startPosition' in a 'resourceMapping' field, in a legacy SRS resource configuration. This value may have a value of '0 to 5' based on last 6 symbols in a slot.

For an additional SRS, an SRS resource configuration may be configured in all symbols in a slot and accordingly, may be configured up to 14 symbols. Accordingly, a 'start-Position' parameter of an (additional) SRS resource may have a value of '0 to 13' for all of 14 symbols in a slot. For an (additional) SRS resource configuration, a parameter, 'nrofSymbols' which means the number of symbols spanning in a slot, may be also extended up to 14 symbols. In other words, an (additional) SRS resource may be guaranteed full flexibility with regard to time domain resource allocation in a slot. However, it increases a probability that an SRS will collide with another UL channel (e.g., a PUCCH, a PUSCH, a PRACH, another SRS, etc.), which may cause ambiguity in a UE operation.

Proposal 2-1: A MAC CE Update Method of a Symbol Level Starting Position Value in a Slot of an SRS Resource Configuration In a RRC configuration of Enhanced UE, a 'startPosition' parameter (and/or 'nrofSymbols') of a separate (additional) SRS resource belonging to a specific BWP of a specific cell may be updated through a MAC CE message (and/or DCI) of a base station. For example, as an offset value is indicated based on a pre-configured RRC 'startPosition' parameter, an SRS starting position in a slot may be updated and as a new starting position value is indicated, an SRS starting position in a slot may be updated.

A terminal may apply a corresponding updated 'startPosition' parameter from a slot after the certain number of slots (e.g., 3 slots) from slot n which transmits an ACK/NACK PUCCH for corresponding MAC CE signaling.

For example, it is assumed that UE received MAC CE signaling (e.g., a command for updating a starting position) for updating 'startPosition' for one SRS resource and UE transmitted HARQ-ACK information for a PDSCH carrying the MAC CE signaling through a PUCCH in slot n. In this case, an assumption and a corresponding operation of UE for SRS transmission corresponding to a configured SRS resource may be applied from a first slot after $n+3N_{slot}^{sub-frame,\mu}$ slots. In this case, $\mu$ is a SCS (subcarrier spacing) configuration for a PUCCH.

Through an operation in the proposal 2-1, a base station may quickly update a starting position of an SRS resource according to a specific situation. In addition, for an enhanced terminal, it has an effect that an SRS resource spanning fully flexibly in a slot may prevent a collision with another UL channel or another SRS (or a UL channel/a RS of another UE). In addition, it may be considered as a simple and the most conservative method which modifies an operation of Rel-15 NR to a minimum.

Proposal 2-2: A DCI Indication Method of a Symbol Level Offset Value for a Symbol Level Starting Position Value in a Slot of an SRS Resource Configuration In a RRC configuration of enhanced UE, a different startPosition parameter may be configured for each SRS resource in a specific SRS resource set. It is to prevent spanning symbols of each SRS resource from colliding with each other in one slot.

A base station may indicate a symbol level offset value when triggering a (aperiodic) SRS resource set through an SRS request field of DCI to enhanced UE. A symbol level offset may be used collectively for shifting a starting position (startPosition) of SRS resources in a corresponding SRS resource set in a slot.

For example, a symbol level offset value may be indicated through a specific field except for an SRS request field in a DCI payload. For example, a specific field in the DCI may have a size of up to 5 bits. For example, a value of up to {−13, −12, . . . , −1, [0], +1, . . . , +12, +13} may be indicated through a specific field in the DCI.

More specifically, when a base station triggers a specific (aperiodic) SRS resource set to enhanced UE through DCI, a symbol level offset value for startPosition may be indicated through a specific field in the DCI. In this case, when transmitting a subsequent corresponding (aperiodic) SRS resource set, a terminal may perform transmission by applying the symbol level offset value to startPosition of all SRS resources in a corresponding resource set.

For example, it is assumed that SRS resource 1 and SRS resource 2 were configured in a specific (aperiodic) SRS resource set of enhanced UE. In addition, it is assumed that a starting position (startPosition) of SRS resource 1 is 0 and the number of symbols (nrofSymbols) of SRS resource 1 is 2 and that a starting position (startPosition) of SRS resource 2 is 3 and the number of symbols (nrofSymbols) of SRS resource 2 is 2. It is assumed that a base station transmits DCI triggering a corresponding SRS resource set to a terminal and a symbol level offset value for a starting position (startPosition) is indicated as +5 through the specific field in corresponding DCI. In this case, as a terminal shifts startPosition of SRS resource 1 to 5 (i.e., 0+5=5), an SRS may be transmitted in 2 symbols by starting from symbol 5. In addition, as a terminal shifts startPosition of SRS resource 2 to 8 (i.e., 3+5=8), an SRS may be transmitted in 2 symbols by starting from symbol 8.

An operation for the above-described symbol level offset may be applied to an (aperiodic) SRS resource set triggered through DCI in a one-time/one-off way. In other words, although a symbol level offset is applied to a first (aperiodic) SRS resource set triggered by first DCI, and subsequently, although a corresponding first (aperiodic) SRS resource set is re-triggered by another second DCI, the symbol level offset may not be applied. In other words, a symbol level offset needs to be indicated again by second DCI. In addition, a symbol level offset may not be changed for an (aperiodic) SRS resource set which is not triggered by the DCI.

Alternatively, an operation indicating the symbol level offset by a configuration/an indication of a base station may configure/indicate semi-permanent update of a starting position (startPosition) of SRS resources in a corresponding SRS resource set (i.e., until RRC/MAC CE/DCI are additionally updated). In this case, when a terminal normally decodes the DCI, a terminal may apply an updated starting position (startPosition) when transmitting the (aperiodic) SRS resource set subsequently. In other words, regardless of whether transmission of a specific SRS resource set is triggered by DCI, a starting position for a specific SRS resource set may be updated. For example, it is assumed that a symbol level offset value for startPosition is indicated through the specific field in DCI and at the same time, that a codepoint of an SRS request field of corresponding DCI is '00' (i.e., no SRS transmission triggering). In this case, when there is an (aperiodic) SRS resource set which is associated/linked/configured by RRC description in a corresponding codepoint, a terminal may (update and) apply the symbol level offset value for the starting position (startPosition) to the corresponding SRS resource set. In other words, for the DCI, a codepoint of the SRS request field is '00', so a terminal does not transmit the SRS for the corresponding SRS resource set, but subsequently, when SRS transmission for the corresponding SRS resource set is triggered by another DCI, UE may apply the symbol level offset value.

Through an operation of the above-described suggestion 2-2, when a base station recognizes that an additional SRS collides with another UL channel or another SRS (or an UL channel/a RS of another UE) in the same UL slot (e.g., a symbol level collision), there is an advantage of facilitating flexible resource allocation by dynamically indicating a symbol level offset value for a starting position (startPosition) of SRS resources in an (aperiodic) SRS resource set when triggering an additional SRS.

Proposal 2-3: A Method of Preventing a Collision with Another UL Channel and Another UE by Indicating an Available (or Unavailable) Symbol Resource in a Slot when Triggering a SRS Through DCI A base station may indicate an available (or unavailable) symbol resource in a slot through a DCI specific field when triggering an (aperiodic) SRS resource set through DCI to enhanced UE (e.g., through an SRS request field in DCI). For example, for a symbol resource which may be used (or may not be used) by DCI in a slot, i) a start symbol and a symbol duration may be indicated or ii) a full bitmap (i.e., a bitmap configured with 14 bits for one slot) may be indicated. In this case, a terminal may perform re-indexing for a symbol index with symbols that SRS resources can be located in the SRS resource set triggered by i) or ii) (or, when unavailable symbols are indicated, remaining symbols excluding symbols that SRS resources cannot be located (unavailable symbols)). In addition, a terminal may transmit an SRS by applying the number of symbols (nrofSymbols) and each starting position (startPosition) of SRS resources in a corresponding SRS resource set within corresponding re-indexed symbols. In other words, in available symbol resources in a slot indicated by the DCI, SRS resources in a triggered SRS resource set are transmitted.

For example, it is assumed that SRS resource 1 and SRS resource 2 were configured in a specific (aperiodic) SRS resource set of enhanced UE. In addition, it is assumed that a starting position (startPosition) of SRS resource 1 is 0 and the number of symbols (nrofSymbols) of SRS resource 1 is 2 and that a starting position (startPosition) of SRS resource 2 is 3 and the number of symbols (nrofSymbols) of SRS resource 2 is 2. It is assumed that a base station transmitted DCI triggering a corresponding SRS resource set to a terminal and that the 8th symbol to the 14th symbol were indicated for an available symbol resource in a slot through i) or ii) in corresponding DCI. In this case, the 8th symbol to the 14th symbol may be re-indexed to symbol index 0 to 6 which may be sequentially used (i.e., index 0 to 6 to which a starting position (startPosition) can be applied). Accordingly, a terminal may transmit SRS resource 1 through the 8th symbol and the 9th symbol (i.e., 2 symbols) by applying the starting position (startPosition) 0 of SRS resource 1, in a re-indexed (available) resource. In addition, a terminal may transmit SRS resource 2 through the 11th symbol and the 12th symbol (2 symbols) by applying the starting position (startPosition) 3 of SRS resource 2, in a re-indexed resource.

Through an operation of the proposal 2-3, when a base station recognizes that an additional SRS collides with another UL channel or another SRS (or an UL channel/a RS of another UE) in the same UL slot (e.g., a symbol level collision), there is an advantage of facilitating flexible resource allocation by dynamically indicating an available (or unavailable) symbol resource in a slot when triggering an additional SRS.

Suggestion 2-4: A Method of Indicating/Updating a Slot Offset (slotOffset) Through a Specific Field Other than an SRS Request Field in Triggering an SRS Through DCI A base station may indicate or update a slot offset (slotOffset) through a DCI specific field when triggering an (aperiodic) SRS resource set through DCI to enhanced UE (e.g., through an SRS request field in DCI). In this case, a slot offset (slotOffset) may mean a time interval (or a slot interval) from a transmission/reception time (slot) of DCI triggering a corresponding SRS resource set to a time/(slot) transmitting a corresponding SRS resource set.

Through the operation, when a base station recognizes that an additional SRS collides with another UL channel or another SRS (or an UL channel/a RS of another UE) in the same UL slot (e.g., a symbol level collision), there is an advantage of facilitating flexible resource allocation by dynamically indicating/updating a slot which will transmit an additional SRS (i.e., a non-colliding UL slot).

An indicating/updating operation for the slot offset (slotOffset) may be applied to an (aperiodic) SRS resource set triggered through DCI in a one-time/one-off way. In other words, although a slot offset (slotOffset) is applied to a first (aperiodic) SRS resource set triggered by first DCI, and subsequently, although a corresponding first (aperiodic) SRS resource set is re-triggered by another second DCI, the slot offset (slotOffset) may not be applied. In other words, a slot offset (slotOffset) needs to be indicated again by second DCI. In addition, a slot offset (slotOffset) may not be changed for an (aperiodic) SRS resource set which is not triggered by the DCI.

Alternatively, an indicating/updating operation for the slot offset (slotOffset) by a configuration/an indication of a base station may configure/indicate semi-permanent update of a slot offset (slotOffset) in a corresponding SRS resource set (until RRC/MAC CE/DCI are additionally updated). In this case, when a terminal normally decodes the DCI, a terminal may apply an updated slot offset (slotOffset) when transmitting an (aperiodic) SRS resource set subsequently. In other words, regardless of whether transmission of a specific SRS resource set is triggered by DCI, a slot offset (slotOffset) for the specific SRS resource set may be updated. For example, it is assumed that a slot offset (slotOffset) value is indicated through the specific field to DCI and at the same time, that a codepoint of an SRS request field of corresponding DCI is '00' (i.e., no SRS transmission triggering). In this case, when there is an (aperiodic) SRS resource set which is associated/linked/configured by RRC description in a corresponding codepoint, a terminal may (update and) apply a slot offset (slotOffset) value for the corresponding SRS resource set.

Proposal 3: A method of triggering 2 or more different aperiodic SRS resource sets through one DCI or/and a method of triggering 1 aperiodic SRS (AP-SRS) resource set by multi-shots (i.e., multiple transmission) through one DCI In a TDD system (or a slot configuration configured as a TDD configuration or a slot format indicator (SFI)), when a terminal is configured/indicated to transmit an additional SRS, an operation which transmits an SRS by delaying/shifting an SRS to an UL slot that a terminal can transmit an SRS may be supported for enhanced UE by considering a limited UL slot (in the same way as LTE). In other words, for an aperiodic SRS, regardless of a slot offset configured in a corresponding SRS resource set or although a slot after a slot offset from a triggered time is not an UL slot, an SRS may be delayed/shifted to an UL slot in which the SRS can be transmitted. Hereinafter, for convenience of description, the operation is referred to as 'operation 3-A'.

This proposal 3 proposes a method which triggers a plurality of (aperiodic) SRS resource sets with one DCI triggering, or triggers a single (aperiodic) SRS resource set but configures/indicates multi-shot transmission across multiple slots to reduce a DCI overhead.

Proposal 3-1: A Method of Triggering a Plurality of (Aperiodic) SRS Resource Sets with One DCI Triggering A base station, through a higher layer configuration (e.g., a RRC configuration), may configure so that 2 or more different (aperiodic) SRS resource sets are linked/associated (through RRC description) to a specific codepoint of an SRS request field in DCI for a specific BWP of a specific cell. In this case, a terminal may expect that a different slot offset (slotOffset) value will be configured for the 2 or more different (aperiodic) SRS resource sets. Here, 2 or more different (aperiodic) SRS resource sets which may be linked/associated to a specific codepoint of the SRS request field may be limited to SRS resource set(s) having the same 'usage' value. In other words, common 'usage' of the (aperiodic) SRS resource set may be a 'codebook', a 'non-codebook', 'beam management', 'antenna switching' or/and 'positioning', etc.

For example, a base station may indicate enhanced UE to transmit a plurality of SRS resource sets (2 or more) for 'beam management' with one DCI transmission. Accordingly, a base station may determine the optimum UL beam in a shorter time by measuring reference signal received power (RSRP) quality for more UL (analog) beams. In this case, the different SRS resource sets for 'beam management' may be used for an UL beam management operation based on mutual understanding/configuration between a base station and a terminal which are UL beams transmitted from different panels of an enhanced terminal. More specifically, for triggering DCI, different SRS resource sets linked/associated to one codepoint may be transmitted from different UL panels of a terminal. As such SRS resource set(s) are linked/associated to one codepoint as a form of an ordered pair, a corresponding order may mean UE panel n and panel n+1. In other words, SRS resource set(s) associated with one codepoint may be mapped to different UE panels in a predetermined order. Here, for convenience of description, it is described by assuming 2 SRS resource sets and 2 panels, but it is not limited thereto. As an example of such an implicit panel indication, a first SRS resource set in an ordered pair as n=1 may be transmitted from UE panel 1 and a second SRS resource set in an ordered pair as n+1 may be transmitted from UE panel 2. Alternatively, as an indicator for a UE panel is configured in a SRS resource set configuration or a SRS resource configuration (e.g., as existing as a 'panel identifier (P-ID)' in the configuration) in a SRS configuration of enhanced UE, a SRS may be explicitly indicated to be transmitted per each of multiple panels of UE. In other words, a panel may be explicitly mapped per specific SRS resource set or per specific SRS resource.

In another example, a base station may indicate enhanced UE to transmit a plurality of SRS resource sets (2 or more) for 'antenna switching (antennaSwitching)' with one DCI transmission. Accordingly, a base station may switch all antennas for a terminal having more Rx antennas. In a specific example, an antenna switching configuration such as xT6R (x Tx antennas selected from 6 Rx antennas, in this case, x is up to 4) or xT8R (x Tx antennas selected from 8 Rx antennas, in this case, x is up to 4) is assumed. In this case, a base station may trigger transmission of a plurality of SRS resource sets (2 or more) for 'antennaSwitching' to a terminal with one DCI. When all of the 6 Rx antennas or/and 8 Rx antennas may not be switched and sounded in 1 slot according to the number of symbols configured in one SRS resource (e.g., a Rx antenna port) in a SRS resource set, all terminal Rx antennas may be configured/indicated to perform full sweeping by configuring to have a different slot offset value for each of a plurality of different SRS resource sets. In particular, for antenna switching of a 1T6R or 1T8R configuration, a case may occur that full sweeping may not be performed even in 2 slots according to the number of symbols configured in an SRS resource in an SRS resource set. Accordingly, it may be effective that a base station triggers 2 or more SRS resource sets for 'antennaSwitching' at a time. In addition, the 2 or more different SRS resource sets for 'antenna switching (antennaSwitching)' may be transmitted from different UL panels of a terminal by a base station configuration (on/off for whether a different SRS resource set is transmitted from different panels). As such SRS resource set(s) are linked/associated to one codepoint as a form of an ordered pair, a corresponding order may mean UE panel n and panel n+1. In other words, SRS resource set(s) associated with one codepoint may be mapped to different UE panels in a predetermined order. In this case, for convenience of description, it is described by assuming 2 SRS resource sets and 2 panels, but it is not limited thereto. As an example of such an implicit panel indication, a first SRS resource set in an ordered pair as n=1 may be transmitted from UE panel 1 and a second SRS resource set in an ordered pair as n+1 may be transmitted from UE panel 2. Alternatively, as an indicator for a UE panel is configured in a SRS resource set configuration or a SRS resource configuration (e.g., as existing as 'P-ID' in the configuration) in a SRS configuration of enhanced UE, a SRS may be explicitly indicated to be transmitted per each of multiple panels of UE. In other words, a panel may be explicitly mapped per specific SRS resource set or per specific SRS resource.

In another example, a base station may indicate enhanced UE to transmit a plurality of SRS resource sets (2 or more) for 'a codebook' or 'a non-codebook' with one DCI transmission. Accordingly, a base station may perform UL link adaptation for different panels in a shorter time. In this case, the different SRS resource sets for 'a codebook' or 'a non-codebook' may be used for an UL link adaptation operation based on mutual understanding/configuration between a base station and a terminal which is an UL beam from different panels of an enhanced terminal. More specifically, for triggering DCI, a different SRS resource set linked/associated to one codepoint may be transmitted from different UL panels of a terminal. As such SRS resource set(s) are linked/associated to one codepoint as a form of an ordered pair, a corresponding order may mean UE panel n and panel n+1. In other words, SRS resource set(s) associated with one codepoint may be mapped to different UE panels in a predetermined order. In this case, for convenience of description, it is described by assuming 2 SRS resource sets and 2 panels, but it is not limited thereto. As an example of such an implicit panel indication, a first SRS resource set in an ordered pair as n=1 may be transmitted from UE panel 1 and a second SRS resource set in an ordered pair as n+1 may be transmitted from UE panel 2. Alternatively, as an indicator for a UE panel is configured in a SRS resource set configuration or a SRS resource configuration (e.g., as existing as 'P-ID' in the configuration) in a SRS configuration of enhanced UE, a SRS may be explicitly indicated to be transmitted per each of multiple panels of UE. In other words, a panel may be explicitly mapped per specific SRS resource set or per specific SRS resource.

In the above-described proposal 3-1, when a plurality of (aperiodic) SRS resource sets are triggered by one DCI triggering, different slot offset (slotOffset) values may be configured for a plurality of different (aperiodic) SRS resource sets. However, an SRS resource set (resources) having a shorter slot offset (slotOffset) value by the above-described operation 3-A may collide with an SRS resource set (resources) having a longer slot offset (slotOffset) value by a delay/a shift. In this case, when different SRS resource sets (resources) are not overlapped at a symbol level in the same slot (i.e., when even any one symbol is not overlapped), all SRS resource sets (resources) may be transmitted in a corresponding slot.

On the other hand, when the different SRS resource sets (resources) are overlapped at a symbol level in the same slot (i.e., when at least one symbol is overlapped), an SRS resource set (resources) having a shorter slot offset (slotOffset) value may be transmitted in a corresponding slot. In addition, transmission of an SRS resource set (resources) having a longer slot offset (slotOffset) value may be performed by a shift/a delay in a subsequent valid UL slot after a corresponding slot. Alternatively, in transmission of an SRS resource set (resources) having a corresponding longer slot offset (slotOffset) value, it may be transmitted only in remaining symbols except for a symbol overlapped in the slot. Alternatively, SRS transmission itself for an SRS resource set (resources) having a corresponding longer slot offset (slotOffset) value may be dropped.

An operation for preventing a collision between different SRS resource sets of the above-described terminal is not limited to a case in which a plurality of (aperiodic) SRS resource sets are triggered by one DCI triggering in proposal 3-1. In other words, it may be also applied to prevent a collision of the same SRS resource set triggered by different DCI and it may be also applied to prevent a collision between different SRS resource sets triggered by different DCI. More specifically, when the same or a different SRS resource set triggered by different DCI collides due to operation 3-A, an SRS resource set triggered by antecedent DCI may be preferentially transmitted. Alternatively, an SRS resource set triggered to perform transmission in an earlier slot based on a value of (a slot position receiving triggering DCI+a configured slot offset (slotOffset)) may be preferentially transmitted.

Conversely, a case in which the operation 3-A is not followed in the above-described proposal 3-1 will be described. A different slot offset (slotOffset) value is configured for the plurality of different (aperiodic) SRS resource sets, but in DCI triggering, any one SRS resource set may not be located in a valid UL slot. In other words, a slot corresponding to a value of (a slot position receiving triggering DCI+a configured slot offset (slotOffset)) for any one first SRS resource set may not be a valid UL slot. In this case, when a slot corresponding to a value of (a slot position receiving triggering DCI+a configured slot offset (slotOffset)) for any one second SRS resource set is a valid UL slot, a terminal may transmit (all) first and second (aperiodic) SRS resource sets in the corresponding valid UL slot at a time. When a symbol level position of SRS resource(s) included in different (aperiodic) SRS resource set(s) is overlapped in the operation (i.e., when at least any one symbol is overlapped), a terminal may transmit a second SRS resource set having a valid slot offset (slotOffset) and drop a remaining first SRS resource set. Alternatively, a base station may indicate which set of a slot offset (slotOffset) (among different SRS resource sets) is applied to a terminal through a corresponding DCI specific field. In other words, for avoiding an invalid UL slot, a base station may indicate a slot offset (slotOffset) of a specific SRS resource set which should be applied so that a terminal can transmit a different SRS resource set in a valid UL slot.

Proposal 3-2: A Method of Triggering One (Aperiodic) SRS Resource Set with One DCI Triggering to Transmit it Multiple (Multi-Shot) Times Across Multiple Slots Option 1) When triggering an (aperiodic) SRS resource set through DCI, a base station may indicate a terminal to transmit a corresponding (aperiodic) SRS resource set of corresponding DCI n times (n is a natural number). For example, it may be indicated by a specific field of corresponding DCI. In addition, for example, for proposal 3-2, despite an aperiodic SRS resource configuration, a parameter for a SRS periodicity and/or offset configuration (e.g., SRS-PeriodicityAndOffset) (which does not exist in the existing aperiodic SRS resource configuration) is defined, so a base station may configure/indicate a corresponding value through higher layer signaling or dynamic signaling. In other words, when a corresponding aperiodic SRS resource (set) is DCI-triggered by a base station to be transmitted n times, a terminal may transmit a corresponding aperiodic SRS resource (set) at a periodicity based on the configured SRS-PeriodicityAndOffset value. For example, an indication for the n transmission may be indicated by a field separate from an SRS request field for triggering DCI and a field for indicating a symbol level offset value of the proposal 2-2. Alternatively, as joint encoding is performed for a field for indicating a symbol level offset value of the proposal 2-2, a base station may indicate to a terminal a symbol level offset value and a value of n for n transmission at the same time through a corresponding field. In other words, a pair of a symbol level offset value and a value of n for n transmission may be indicated per codepoint of a joint-encoded field. Alternatively, all symbol level offset values in a field for indicating a symbol level offset value may be allocated to codepoints and the value of n may be allocated to remaining codepoints. In this case, one symbol level offset value or a value of n for n transmission may be indicated per codepoint.

Alternatively, if a base station indicates a terminal to transmit a corresponding (aperiodic) SRS resource set n times through corresponding DCI (e.g., through a specific field in DCI) when triggering an (aperiodic) SRS resource set through DCI, a terminal may repeatedly transmit a corresponding SRS resource set in n consecutive (valid) UL slot(s) based on a first valid UL slot after a pre-configured slot offset (slotOffset) (in this case, a first valid UL slot may be determined by including a slot according to a slot offset).

In the above-described embodiments, a value of n for n transmission of an SRS may be configured/updated by MAC CE or RRC. For example, a value of n, the number of repetitive transmission, may be configured in an (aperiodic) SRS resource set configuration.

Option 2) for a value of SRS-PeriodicityAndOffset, a parameter configuring periodicity and an offset value in an SRS resource set by enhancing the existing semi-persistent SRS resource set configuration, for example, periodicity of 1 ms may be configured. In addition, when a base station triggers a SP (semi-persistent)-SRS resource set that periodicity of 1 ms is configured through DCI, a terminal may transmit a corresponding SRS resource set n times as in the above-described Option 1. Here, 1 ms may correspond to a case in which a duration of a subframe/a slot, a transmission unit when transmitting an SRS 1 time, is 1 ms. In other words, when a duration of a subframe/a slot, a transmission unit when transmitting an SRS 1 time, is t [ms], a value of t [ms] may be configured by the SRS-PeriodicityAndOffset. A value of n may be configured in the semi-persistent SRS resource set configuration and may be updated by MAC CE or RRC signaling. In addition, for the semi-persistent SRS resource set, a slot offset (slotOffset) value configured in an aperiodic SRS despite a SP-SRS may be configured. In other words, when the SP-SRS is triggered, a terminal may repeatedly transmit a corresponding SRS resource set in n consecutive (valid) UL slot(s) based on a first valid UL slot after a slot offset (slotOffset) value (in this case, a first valid UL slot may be determined by including a slot according to a slot offset) after receiving DCI.

Alternatively, when a base station triggers a corresponding SP-SRS resource set through DCI, a terminal may start to repeatedly transmit a corresponding SRS resource set in (valid) UL slot(s) from a (valid) UL slot after a slot offset (slotOffset) value (in this case, a first valid UL slot may be determined by including a slot according to a slot offset) after receiving DCI. In addition, subsequently, when re-receiving DCI triggering the SP-SRS resource set, a terminal may stop the repetitive transmission of an SRS. In other words, the number of repetitive transmission of an SRS may be controlled by DCI and a value of n, the number of the repetitive transmission, may not be pre-configured. For a stop point, a terminal may transmit an SRS resource set until a slot offset (slotOffset) value (or, until a slot according to a slot offset) after re-receiving DCI triggering the SP-SRS resource set (i.e., receiving DCI indicating stop) and may stop transmission subsequently.

For the above-described Option 1 and Option 2, a base station may configure/indicate whether an antenna and/or a panel will be switched and transmitted when repeatedly transmitting an SRS resource set through a separate configuration in a SRS resource set or a separate indication of triggering DCI. In other words, when antenna switching or/and panel switching is configured/indicated to be on (i.e., activated) by the configuration/indication, a terminal performs transmission by switching an antenna or/and a panel per SRS resource set transmission. Conversely, when antenna switching or/and panel switching is configured/indicated to be off (i.e., deactivated), a terminal performs repetitive transmission on the same antenna or/and panel per SRS resource set transmission.

Even in NR up to the existing Rel-16, a base station may be configured to transmit an SRS with periodicity several times for a certain period to a terminal through activation/deactivation of a semi-persistent SRS resource set. However, such an operation is indicated to a terminal through a MAC CE message, so it may be an outdated method with regard to latency compared with what is indicated by DCI as in the proposal 3-2. In addition, through a method of the proposal 3-2, there is an advantage to prevent waste of an indiscreet activation/deactivation MAC CE message.

The above-described proposal 3-1 and 3-2 may be independently applied/implemented or may be applied/implemented in a form that two operations of proposal 3-1 and proposal 3-2 are combined.

When an operation based on at least one of the embodiments (e.g., at least one of proposal 1/proposal 2/proposal 3) is performed, a terminal may transmit a corresponding SRS by utilizing a flexible symbol when an UL slot of timing transmitting an additional SRS (by DCI triggering) is a flexible slot or/and when a symbol transmitting a SRS in a corresponding UL slot is overlapped with a flexible symbol. However, when transmission of another DL channel or UL channel is configured/indicated/scheduled in advance in a corresponding flexible symbol to collide with an SRS, a terminal may drop a SRS.

Figure 8:
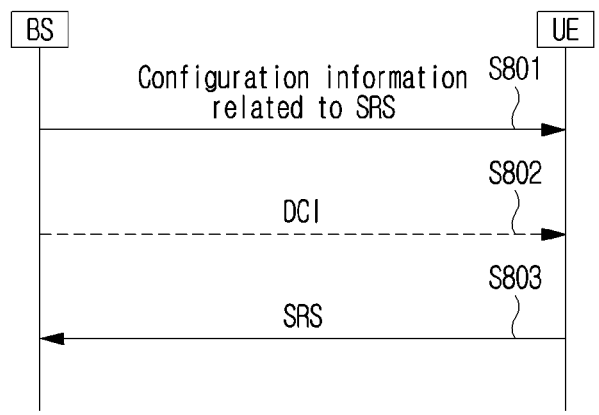
FIG. 8 is a diagram illustrating a signaling procedure between a base station and a terminal for a method of transmitting and receiving a sounding reference signal according to an embodiment of the present disclosure.

FIG. 8 is a diagram illustrating a signaling procedure between a base station and a terminal for a method of transmitting and receiving a sounding reference signal according to an embodiment of the present disclosure.

FIG. 8 illustrates a signaling procedure between a terminal and a base station based on the above-proposed proposal 1 to proposal 3. An example in FIG. 8 is for convenience of description, and it does not limit a scope of the present disclosure. Some step(s) illustrated in FIG. 8 may be omitted according to a situation and/or a configuration. In addition, in FIG. 8, a base station and a terminal are just one example and may be implemented by an apparatus illustrated in the following FIG. 11 and FIG. 12. For example, a processor 102/202 in FIG. 11 may control to transmit and receive a channel/a signal/data/information, etc. (e.g., SRS-related configuration information, DCI for UL/DL scheduling, an additional SRS, a PDCCH, a PDSCH, a PUSCH, a PUCCH, a PHICH, etc.) by using a transceiver 106/206 and may control to store a channel/a signal/data/information, etc. to be transmitted or received in a memory 104/204.

In reference to FIG. 8, a base station (BS) may transmit SRS-related configuration information to user equipment (UE) (S801).

Here, UE may receive SRS-related configuration information from a base station.

In this case, as in the above-described proposal 1 to proposal 3, SRS-related configuration information may include configuration information related to SRS transmission, configuration information on one or more SRS resource sets (i.e., N (N is a natural number) SRS resource sets), etc., and each SRS resource set may include one or more SRS resources, and accordingly, configuration information may include configuration information on one or more SRS resources.

In addition, configuration information may include a usage value per SRS resource set (or per SRS resource). In this case, usage may include a codebook, a non-codebook, beam management, antenna switching (antennaSwitching) or/and positioning, etc.

In addition, configuration information may include time domain behavior (i.e., periodic transmission, aperiodic transmission, semi-persistent transmission) information per SRS resource set (or per SRS resource).

As in the above-described proposal 1, configuration information for a legacy SRS configuration and configuration information for an additional SRS configuration may be distinguished and transmitted to UE.

In addition, as in the above-described proposal 2, the configuration information (in particular, configuration information for an additional SRS) may include symbol level starting position (startposition) information of SRS transmission in a slot and/or information on the number of symbols (nrofsymbols) for SRS transmission in a slot per SRS resource set (or per SRS resource in an SRS resource set).

In addition, the configuration information (in particular, configuration information for an additional SRS) may include slot offset information per SRS resource set (or per SRS resource). Here, a slot offset may mean an interval for a slot that the triggered SRS resource set (or SRS resource) is transmitted from a slot that DCI triggering transmission of an SRS resource set (or an SRS resource) is transmitted.

In addition, the configuration information (in particular, configuration information for an additional SRS) may include mapping information on an SRS resource set (or an SRS resource) and a codepoint triggering transmission of an SRS in DCI per each SRS resource set (or per SRS resource) and/or mapping information between a UE panel and an SRS resource set (or an SRS resource) mapped to the codepoint. Alternatively, such mapping information may be defined in advance by a specific rule.

In addition, as in the above-described proposal 3, the configuration information (in particular, configuration information for an additional SRS) may include periodicity and offset information for aperiodic SRS resource set (or SRS resource).

A base station may transmit DCI related to SRS transmission (triggering SRS transmission) to UE (through a PDCCH) (S802).

In other words, UE may receive DCI related to SRS transmission (triggering SRS transmission) from a base station (through a PDCCH).

DCI may include information (a field) which triggers SRS transmission for one or more SRS resource sets (i.e., M (M≤N, M is a natural number) SRS resource sets) among one or more SRS resource sets configured in Step S801 above (i.e., N SRS resource sets).

As in the above-described proposal 2, a symbol level offset for one or more SRS resource sets may be indicated by DCI and transmission of the SRS in a slot may be determined as a symbol level offset is applied to a starting position configured by the S801 configuration information. Here, one or more SRS resource sets that a symbol level offset is indicated by DCI are not limited to a SRS resource set triggered by the DCI.

In addition, an available symbol in a slot may be indicated by DCI and in this case, a symbol index of an available symbol may be re-indexed sequentially. In addition, a starting position and/or the number of slots configured in the step S801 may be applied in an available symbol that a symbol index is re-indexed.

In addition, as in the above-described proposal 3, a plurality of SRS resource sets may be mapped/associated/linked to each codepoint in a field which triggers SRS transmission in DCI. In addition, a plurality of SRS resource sets mapped/associated/linked to a codepoint may be mapped to different panels of a terminal in a predetermined order.

In addition, as in the above-described proposal 3, an SRS for one SRS resource set may be indicated to be transmitted by the DCI multiple (multi-shot) times across multiple slots.

In addition, it is not illustrated in FIG. 8, but a base station may transmit MAC CE related to SRS transmission to UE. In other words, UE may receive MAC CE related to SRS transmission from a base station.

In this case, MAC CE related to SRS transmission may include information for updating a symbol level starting position value of SRS transmission in a slot.

UE may transmit an SRS to a base station based on received SRS-related configuration information and DCI (S783). In other words, a base station may receive an SRS from the UE.

In this case, as in the proposal 2, UE may perform the SRS transmission based on a symbol level starting position and/or the number of symbols in a slot configured for a triggered SRS resource set (or an SRS resource in an SRS resource set). In addition, when a symbol level offset for a symbol level starting position in a slot is indicated for an SRS resource set (or an SRS resource in an SRS resource set) in DCI, a terminal may perform SRS transmission in a symbol determined based on a symbol level offset.

In addition, as in the proposal 2, when an available symbol in a slot is indicated by DCI, SRS transmission may be performed by applying a starting position and/or the number of slots configured for an SRS resource set (or an SRS resource in an SRS resource set) triggered in an available symbol that a symbol index is re-indexed.

In addition, as in the proposal 3, when transmission of one or more SRS resource sets (i.e., M SRS resource sets) is triggered by the DCI, UE may transmit the SRS to a base station in an SRS resource of each of the M SRS resource sets.

Here, each of the M SRS resource sets may be related to different panels of the terminal.

When transmission of one or more SRS resource sets (i.e., M SRS resource sets) is triggered by the DCI, UE may perform SRS transmission respectively for corresponding slots by applying a configured slot offset to each SRS resource set, respectively. Here, as described above, regardless of a slot offset configured in a corresponding SRS resource set or although a slot after a slot offset from a triggered time is not an UL slot, an SRS may be delayed/shifted to an UL slot in which the SRS can be transmitted. Accordingly, when a different slot offset is configured, but SRSs for one or more SRS resource sets (i.e., M SRS resource sets) collides in at least one symbol in a first slot, a SRS for a SRS resource set that a shorter slot offset is configured may be transmitted in the first slot and a SRS for a SRS resource set that a longer slot offset is configured may be transmitted in an uplink slot in which the SRS can be transmitted after the first slot. Such an operation may be also applied to a case in which different SRS resource sets are triggered by different DCI and collides in the same symbol without being limited to a case in which multiple SRS resource sets are triggered by one DCI.

In addition, as in the proposal 3, when a SRS for one SRS resource set is indicated to be transmitted by one DCI multiple (multi-shot) times across multiple slots, UE may repeatedly transmit a SRS for a corresponding SRS resource set across multiple slots.

In addition, periodic and semi-persistent SRS transmission is not triggered by the DCI, so in this case, step S802 may be omitted.

Figure 9:
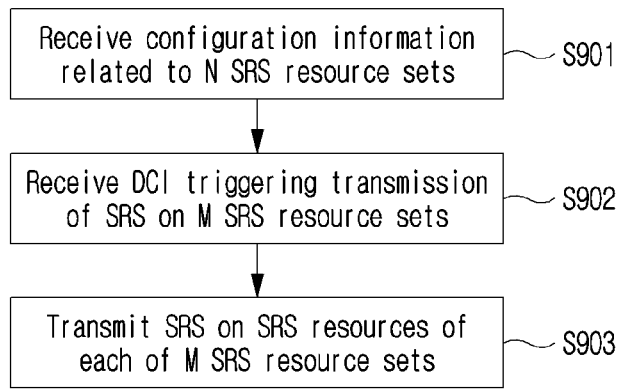
FIG. 9 is a diagram illustrating an operation of a terminal for transmitting and receiving a sounding reference signal according to an embodiment of the present disclosure.

FIG. 9 is a diagram illustrating an operation of a terminal for transmitting and receiving a sounding reference signal according to an embodiment of the present disclosure.

FIG. 9 exemplifies an operation of a terminal based on the proposals 1 to 3 above. FIG. 9 is only an example for convenience of description, and does not limit the scope of the present disclosure. Some step(s) illustrated in FIG. 9 may be omitted depending on circumstances and/or configurations. In addition, a terminal in FIG. 9 is only one example, and may be implemented as the apparatus illustrated in FIGS. 11 and 12 below. For example, the processor 102/202 of FIG. 11 may control to transmit/receive a channel/signal/data/information (e.g., SRS-related configuration information, DCI for UL/DL scheduling, additional SRS, PDCCH, PDSCH, PUSCH, PUCCH, PHICH, etc.) using the transceiver 106/206, and may control to store the transmitted or received channel/signal/data/information in the memory 104/204.

Referring to FIG. 9, a terminal receives configuration information related to N (N is a natural number) SRS resource sets from a base station (S901).

Here, configuration information may include a usage value for each SRS resource set (or for each SRS resource). Here, usage may include codebook, non-codebook (non-Codebook), beam management (beamManagement), antenna switching (antennaSwitching) and/or positioning, etc.

In addition, configuration information may include time domain operation (i.e., periodic transmission, aperiodic transmission, semi-persistent transmission) information for each SRS resource set (or for each SRS resource).

As in the above-mentioned proposal 1, configuration information for configuring a legacy SRS and configuration information for configuring an additional SRS may be separated and transmitted to a UE.

In addition, as in the above-mentioned proposal 2, the configuration information (in particular, configuration information for an additional SRS) may include, for each SRS resource set (or for each SRS resource in an SRS resource set), information (startposition) on a symbol level starting position in a slot for SRS transmission and/or information (nrofsymbols) on the number of symbols in a slot for SRS transmission.

In addition, the configuration information (in particular, configuration information for an additional SRS) may include a slot offset information for each SRS resource set (or for each SRS resource). Here, a slot offset may mean an interval from a slot in which DCI triggering transmission of an SRS resource set (or SRS resource) is transmitted to a slot in which the triggered SRS resource set (or SRS resource) is transmitted.

In addition, the configuration information (in particular, configuration information for an additional SRS) may include, for each SRS resource set (or for each SRS resource), mapping information for a codepoint that triggers transmission of an SRS in DCI and an SRS resource set (or SRS resource) and/or mapping information between the SRS resource set (or SRS resource) mapped to the codepoint and a UE panel. Alternatively, such mapping information may be predefined as a specific rule.

In addition, as in the above-mentioned proposal 3, the configuration information (in particular, configuration information for an additional SRS) may include period and offset information for an aperiodic SRS resource set (or SRS resource).

A terminal receives DCI for triggering SRS transmission on M (M≤N, M is a natural number) SRS resource sets among N SRS resource sets from a base station (S902).

As in the above-mentioned proposal 2, a symbol level offset for one or more SRS resource sets may be indicated by DCI, and the transmission of the SRS in a slot may be determined by applying a symbol level offset to a starting position configured by the configuration information of S801. Here, one or more SRS resource sets indicated by a symbol level offset by DCI are not limited to SRS resource sets triggered by the DCI.

In addition, available symbols in a slot may be indicated by DCI, and in this case, symbol indexes of available symbols may be sequentially re-indexed. In addition, the starting position and/or the number of slots configured in step S801 may be applied within available symbols for which symbol indexes are re-indexed.

In addition, as in the above-mentioned proposal 3, a plurality of SRS resource sets may be mapped/associated/linked to each codepoint of a field triggering SRS transmission in DCI.

In addition, a plurality of SRS resource sets mapped/associated/linked to a codepoint may be mapped to different panels of a terminal in a predetermined order.

In addition, as in the above-mentioned proposal 3, an SRS for one SRS resource set may be indicated to be transmitted multiple times (multi-shot) over a plurality of slots by the DCI.

Here, a MAC CE related to SRS transmission may include information for updating a symbol level starting position value of SRS transmission in a slot.

A terminal transmits an SRS to a base station on SRS resources of each of M SRS resource sets (S903).

Here, each of the M SRS resource sets may be related to a different panel of the terminal.

In addition, as in proposal 3 above, when transmission of one or more SRS resource sets (i.e., M SRS resource sets) is triggered by the DCI, a UE may transmit the SRS to a base station on SRS resources of each of the M SRS resource sets.

When transmission of one or more SRS resource sets (i.e., M SRS resource sets) is triggered by the DCI, a UE may apply a slot offset configured for each SRS resource set, respectively, and perform SRS transmission on the corresponding slots, respectively. Here, as described above, regardless of a slot offset set configured for a corresponding SRS resource set or even if a slot after a slot offset from a triggered time is not a UL slot, an SRS may be delayed/shifted up to an available UL slot for transmitting the SRS. Accordingly, although different slot offsets are configured, if SRSs for one or more SRS resource sets (i.e., M SRS resource sets) collide in at least one symbol in a first slot, an SRS for an SRS resource set in which the shorter slot offset is configured may be transmitted in the first slot, and an SRS for an SRS resource set in which the longer slot offset is configured may be transmitted in an uplink slot available for SRS transmission after the first slot. This operation is not limited to a case in which multiple SRS resource sets are triggered by one DCI, and may be applied even when different SRS resource sets are triggered by different DCIs and collide in the same symbol.

In addition, as in Proposal 3 above, when an SRS for one SRS resource set is indicated to be transmitted multiple times (multi-shot) over a plurality of slots by one DCI, a UE may repeatedly transmit the SRS for the corresponding SRS resource set over a plurality of slots.

In addition, as in proposal 2 above, a UE may perform the SRS transmission based on a symbol level starting position and/or the number of symbols in a slot configured for the triggered SRS resource set (or an SRS resource in an SRS resource set). In addition, when a symbol level offset for a symbol level starting position in a slot is indicated for an SRS resource set (or an SRS resource in an SRS resource set) in DCI, a terminal may perform SRS transmission in a symbol determined based on the symbol level offset.

In addition, as in the previous proposal 2, when available symbols in a slot are indicated by DCI, SRS transmission may be performed by applying configured starting position and/or the number of slots to the triggered SRS resource set (or an SRS resource in an SRS resource set) in the available symbols in which symbol indexes are re-indexed.

Figure 10:
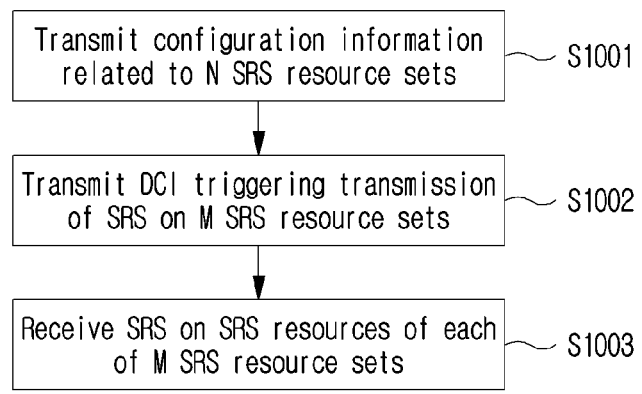
FIG. 10 is a diagram illustrating an operation of a base station for transmitting and receiving a sounding reference signal according to an embodiment of the present disclosure.

FIG. 10 is a diagram illustrating an operation of a base station for transmitting and receiving a sounding reference signal according to an embodiment of the present disclosure.

FIG. 10 exemplifies an operation of a base station based on the proposals 1 to 3 above. FIG. 10 is only an example for convenience of description, and does not limit the scope of the present disclosure. Some step(s) illustrated in FIG. 10 may be omitted depending on circumstances and/or configurations. In addition, a base station in FIG. 10 is only one example, and may be implemented as the apparatus illustrated in FIG. 11 below. For example, the processor 102/202 of FIG. 11 may control to transmit/receive a channel/signal/data/information (e.g., SRS-related configuration information, DCI for UL/DL scheduling, additional SRS, PDCCH, PDSCH, PUSCH, PUCCH, PHICH, etc.) using the transceiver 106/206, and may control to store the transmitted or received channel/signal/data/information in the memory 104/204.

In FIG. 10, a base station transmits configuration information related to N (N is a natural number) SRS resource sets to a terminal (S1001).

Here, configuration information may include a usage value for each SRS resource set (or for each SRS resource). Here, usage may include codebook, non-codebook (non-Codebook), beam management (beamManagement), antenna switching (antennaSwitching) and/or positioning, etc.

In addition, configuration information may include time domain operation (i.e., periodic transmission, aperiodic transmission, semi-persistent transmission) information for each SRS resource set (or for each SRS resource).

As in the above-mentioned proposal 1, configuration information for configuring a legacy SRS and configuration information for configuring an additional SRS may be separated and transmitted to a UE.

In addition, as in the above-mentioned proposal 2, the configuration information (in particular, configuration information for an additional SRS) may include, for each SRS resource set (or for each SRS resource in an SRS resource set), information (startposition) on a symbol level starting position in a slot for SRS transmission and/or information (nrofsymbols) on the number of symbols in a slot for SRS transmission.

In addition, the configuration information (in particular, configuration information for an additional SRS) may include a slot offset information for each SRS resource set (or for each SRS resource). Here, a slot offset may mean an interval from a slot in which DCI triggering transmission of an SRS resource set (or SRS resource) is transmitted to a slot in which the triggered SRS resource set (or SRS resource) is transmitted.

In addition, the configuration information (in particular, configuration information for an additional SRS) may include, for each SRS resource set (or for each SRS resource), mapping information for a codepoint that triggers transmission of an SRS in DCI and an SRS resource set (or SRS resource) and/or mapping information between the SRS resource set (or SRS resource) mapped to the codepoint and a UE panel. Alternatively, such mapping information may be predefined as a specific rule.

In addition, as in the above-mentioned proposal 3, the configuration information (in particular, configuration information for an additional SRS) may include period and offset information for an aperiodic SRS resource set (or SRS resource).

A base station transmits DCI for triggering SRS transmission on M (M≤N, M is a natural number) SRS resource sets among N SRS resource sets to a terminal (S1002).

As in the above-mentioned proposal 2, a symbol level offset for one or more SRS resource sets may be indicated by DCI, and the transmission of the SRS in a slot may be determined by applying a symbol level offset to a starting position configured by the configuration information of S801. Here, one or more SRS resource sets indicated by a symbol level offset by DCI are not limited to SRS resource sets triggered by the DCI.

In addition, available symbols in a slot may be indicated by DCI, and in this case, symbol indexes of available symbols may be sequentially re-indexed. In addition, the starting position and/or the number of slots configured in step S801 may be applied within available symbols for which symbol indexes are re-indexed.

In addition, as in the above-mentioned proposal 3, a plurality of SRS resource sets may be mapped/associated/linked to each codepoint of a field triggering SRS transmission in DCI. In addition, a plurality of SRS resource sets mapped/associated/linked to a codepoint may be mapped to different panels of a terminal in a predetermined order.

In addition, as in the above-mentioned proposal 3, an SRS for one SRS resource set may be indicated to be transmitted multiple times (multi-shot) over a plurality of slots by the DCI.

Here, a MAC CE related to SRS transmission may include information for updating a symbol level starting position value of SRS transmission in a slot.

A base station receives an SRS on SRS resources of each of M SRS resource sets from a terminal (S1003).

Here, each of the M SRS resource sets may be related to a different panel of the terminal.

In addition, as in proposal 3 above, when transmission of one or more SRS resource sets (i.e., M SRS resource sets) is triggered by the DCI, a UE may transmit the SRS to a base station on SRS resources of each of the M SRS resource sets.

When transmission of one or more SRS resource sets (i.e., M SRS resource sets) is triggered by the DCI, a UE may apply a slot offset configured for each SRS resource set, respectively, and perform SRS transmission on the corresponding slots, respectively. Here, as described above, regardless of a slot offset set configured for a corresponding SRS resource set or even if a slot after a slot offset from a triggered time is not a UL slot, an SRS may be delayed/shifted up to an available UL slot for transmitting the SRS. Accordingly, although different slot offsets are configured, if SRSs for one or more SRS resource sets (i.e., M SRS resource sets) collide in at least one symbol in a first slot, an SRS for an SRS resource set in which the shorter slot offset is configured may be transmitted in the first slot, and an SRS for an SRS resource set in which the longer slot offset is configured may be transmitted in an uplink slot available for SRS transmission after the first slot. This operation is not limited to a case in which multiple SRS resource sets are triggered by one DCI, and may be applied even when different SRS resource sets are triggered by different DCIs and collide in the same symbol.

In addition, as in Proposal 3 above, when an SRS for one SRS resource set is indicated to be transmitted multiple times (multi-shot) over a plurality of slots by one DCI, a UE may repeatedly transmit the SRS for the corresponding SRS resource set over a plurality of slots.

In addition, as in proposal 2 above, a UE may perform the SRS transmission based on a symbol level starting position and/or the number of symbols in a slot configured for the triggered SRS resource set (or an SRS resource in an SRS resource set). In addition, when a symbol level offset for a symbol level starting position in a slot is indicated for an SRS resource set (or an SRS resource in an SRS resource set) in DCI, a terminal may perform SRS transmission in a symbol determined based on the symbol level offset.

In addition, as in the previous proposal 2, when available symbols in a slot are indicated by DCI, SRS transmission may be performed by applying configured starting position and/or the number of slots to the triggered SRS resource set (or an SRS resource in an SRS resource set) in the available symbols in which symbol indexes are re-indexed.

General Device to which the Present Disclosure May be Applied

Figure 11:
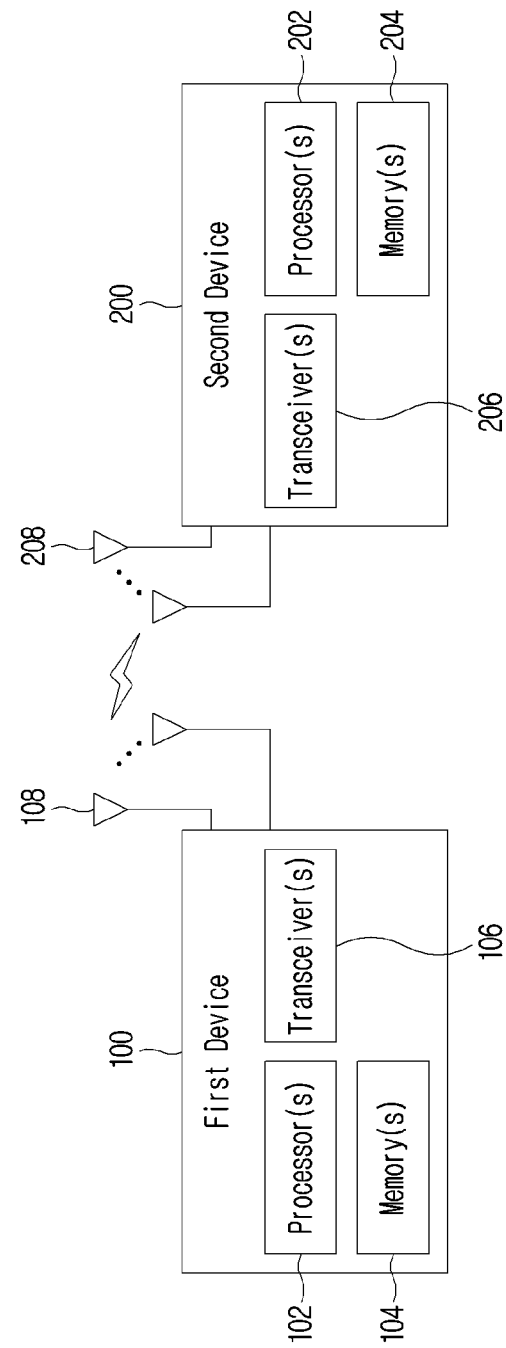
FIG. 11 illustrates a block diagram of a wireless communication system according to an embodiment of the present disclosure.

FIG. 11 is a diagram which illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Figure 12:
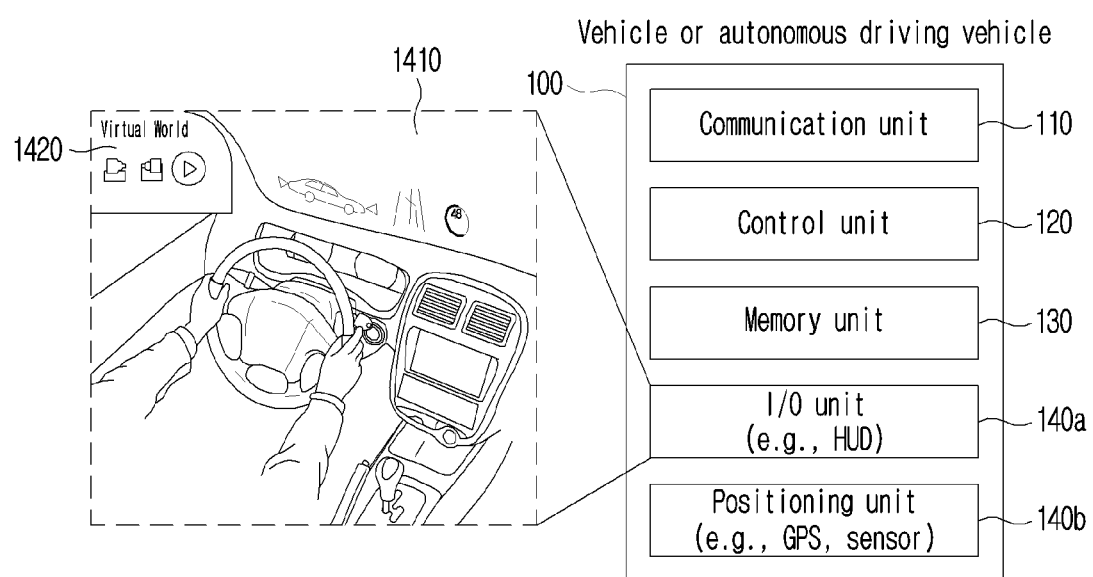
FIG. 12 illustrates a vehicle device according to an embodiment of the present disclosure.

FIG. 12 illustrates a vehicle device according to an embodiment of the present disclosure.

In reference to FIG. 12, a vehicle 100 may include a communication unit 110, a control unit 120, a memory unit 130, an input and output unit 140a and a positioning unit 140b.

A communication unit 110 may transmit and receive a signal (e.g., data, a control signal, etc.) with external devices of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140a may output an AR/VR object based on information in a memory unit 130. An input and output unit 140a may include HUD. A positioning unit 140b may obtain position information of a vehicle 100. Position information may include absolute position information, position information in a driving lane, acceleration information, position information with a surrounding vehicle, etc. of a vehicle 100. A positioning unit 140b may include a GPS and a variety of sensors.

In an example, a communication unit 110 of a vehicle 100 may receive map information, traffic information, etc. from an external server and store them in a memory unit 130. A positioning unit 140b may obtain vehicle position information through a GPS and a variety of sensors and store it in a memory unit 130. A control unit 120 may generate a virtual object based on map information, traffic information and vehicle position information, etc. and an input and output unit 140a may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140a. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
receiving, by a terminal, from a base station, configuration information related to a plurality of resource sets for uplink reference signal transmission;
receiving, by the terminal, from the base station, downlink control information for triggering the uplink reference signal transmission on two resource sets among the plurality of resource sets; and
transmitting, by the terminal, to the base station, the uplink reference signal transmission on one or more resources of each of the two resource sets,
wherein the two resource sets are related to different panels of the terminal,
wherein each slot offset is configured for each of the plurality of resource sets in the configuration information,
wherein the slot offset is an interval between a slot for the downlink control information and an uplink reference signal transmission slot for each of the plurality of resource sets, and wherein, based on the uplink reference signal transmission for the two resource sets colliding in at least one symbol in one slot, the uplink reference signal transmission for a first resource set in which a shorter slot offset is configured is transmitted in the one slot, and the uplink reference signal transmission for a second resource set in which a longer slot offset is configured is transmitted in an uplink slot available for the uplink reference signal transmission after the one slot.

2. The method of claim 1, wherein the two resource sets are configured with the same usage value.

3. The method of claim 2, wherein the usage value includes at least one of beam management, codebook, non-codebook, antenna switching and/or positioning.

4. The method of claim 1, wherein the two resource sets are mapped to different codepoints of one field triggering the uplink reference signal transmission in the downlink control information.

5. The method of claim 4, wherein the two resource sets are mapped to different panels of the terminal in a predetermined order.

6. The method of claim 1, wherein the configuration information includes a starting position for the uplink reference signal transmission in a slot and/or the number of symbols for the uplink reference signal transmission in a slot for each resource in the plurality of resource sets.

7. The method of claim 6, wherein the starting position is updated by the base station.

8. The method of claim 6, wherein each symbol level offset for each of the two resource sets is indicated by the downlink control information, and
wherein the uplink reference signal transmission in a slot is determined by applying the symbol level offset to the starting position.

9. The method of claim 6, wherein symbol level offsets for the plurality of resource sets are indicated by the downlink control information.

10. The method of claim 1, wherein available symbols in a slot are indicated by the downlink control information, and
wherein symbol indexes for the available symbols are re-indexed, and the starting position and/or the number of slots are applied in the re-indexed available symbols.

11. The method of claim 1, wherein the two resource sets are transmitted repeatedly multiple times over a plurality of slots.

12. A terminal comprising:
at least one transceiver for transmitting and receiving a wireless signal; and
at least one processor for controlling the at least one transceiver,
wherein the at least one processor configured to:
receive, from a base station, configuration information related to a plurality of resource sets for uplink reference signal transmission;
receive, from the base station, downlink control information for triggering the uplink reference signal transmission on two resource sets among the plurality of resource sets; and
transmit, to the base station, the uplink reference signal transmission on one or more resources of each of the two resource sets,
wherein the two resource sets are related to different panels of the terminal,
wherein each slot offset is configured for each of the plurality of resource sets in the configuration information,
wherein the slot offset is an interval between a slot for the downlink control information and an uplink reference signal transmission slot for each of the plurality of resource sets, and
wherein, based on the uplink reference signal transmission for the two resource sets colliding in at least one symbol in one slot, the uplink reference signal transmission for a first resource set in which a shorter slot offset is configured is transmitted in the one slot, and the uplink reference signal transmission for a second resource set in which a longer slot offset is configured is transmitted in an uplink slot available for the uplink reference signal transmission after the one slot.

13. A method comprising:
transmitting, by a base station, to a terminal, configuration information related to a plurality of resource sets for uplink reference signal transmission;
transmitting, by the base station, from the terminal, downlink control information for triggering the uplink reference signal transmission on two resource sets among the plurality of resource sets; and
receiving, by the base station, from the terminal, the uplink reference signal transmission on one or more resources of each of the two resource sets,
wherein the two resource sets are related to different panels of the terminal,
wherein each slot offset is configured for each of the plurality of resource sets in the configuration information,
wherein the slot offset is an interval between a slot for the downlink control information and an uplink reference signal transmission slot for each of the plurality of resource sets, and
wherein, based on the uplink reference signal transmission for the two resource sets colliding in at least one symbol in one slot, the uplink reference signal transmission for a first resource set in which a shorter slot offset is configured is transmitted in the one slot, and the uplink reference signal transmission for a second resource set in which a longer slot offset is configured is transmitted in an uplink slot available for the uplink reference signal transmission after the one slot.

* * * * *